(12) United States Patent
Iden et al.

(10) Patent No.: US 10,367,218 B2
(45) Date of Patent: Jul. 30, 2019

(54) ELECTRODE CATALYST LAYER FOR FUEL CELL, METHOD FOR PRODUCING THE SAME, AND MEMBRANE ELECTRODE ASSEMBLY AND FUEL CELL USING THE CATALYST LAYER

(71) Applicants: NISSAN MOTOR CO., LTD., Yokohama-shi, Kanagawa (JP); DAIMLER AG, Stuttgart (DE); FORD MOTOR COMPANY, Dearborn, MI (US)

(72) Inventors: Hiroshi Iden, Kanagawa (JP); Atsushi Ohma, Kanagawa (JP); Shinichi Takahashi, Kanagawa (JP); Tetsuya Mashio, Kanagawa (JP); Norifumi Horibe, Kanagawa (JP)

(73) Assignees: NISSAN MOTOR CO., LTD., Yokohama-shi (JP); DAIMLER AG, Stuttgart (DE); FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 15/522,023

(22) PCT Filed: Oct. 8, 2015

(86) PCT No.: PCT/JP2015/078614
§ 371 (c)(1),
(2) Date: Apr. 26, 2017

(87) PCT Pub. No.: WO2016/067878
PCT Pub. Date: May 6, 2016

(65) Prior Publication Data
US 2017/0331134 A1   Nov. 16, 2017

(30) Foreign Application Priority Data
Oct. 29, 2014   (JP) ................. 2014-220573

(51) Int. Cl.
*H01M 8/10* (2016.01)
*H01M 8/1004* (2016.01)
(Continued)

(52) U.S. Cl.
CPC ....... *H01M 8/1004* (2013.01); *H01M 4/8605* (2013.01); *H01M 4/8652* (2013.01);
(Continued)

(58) Field of Classification Search
CPC ............. H01M 8/1004; H01M 8/1039; H01M 8/0234; H01M 2008/1095; H01M 4/926;
(Continued)

(56) References Cited

U.S. PATENT DOCUMENTS 5,866,423 A   2/1999   Sugawara et al.
6,242,260 B1   6/2001   Sugawara et al.
(Continued)

FOREIGN PATENT DOCUMENTS

EP   1 852 180 A1   11/2007
EP   2 990 105 A1   3/2016
(Continued)

OTHER PUBLICATIONS

Subbaraman et al. "Three Phase Interfaces at Electrified Metal-Solid Electrolyte System 1. Study of the Pt(hkl)-Nafion Interface". J Phys Chem C 2010. 114 (18), pp. 8414-8422.*
(Continued)

*Primary Examiner* — Stephen J Yanchuk
(74) *Attorney, Agent, or Firm* — Foley & Lardner LLP

(57) ABSTRACT

Provided is an electrode catalyst layer excellent in gas transportability by using an electrode catalyst layer for fuel cell comprising a catalyst containing a catalyst carrier and a catalytic metal carried on the catalyst carrier and an electrolyte, wherein the catalyst partially is coated with the electrolyte, and a specific surface area of the catalytic metal
(Continued)

which gas can reach without passing through an electrolyte is 50% or more, with respect to the total specific surface area of the catalytic metal.

13 Claims, 2 Drawing Sheets

(51) Int. Cl.
    *H01M 4/92*      (2006.01)
    *H01M 8/1039*    (2016.01)
    *H01M 8/1041*    (2016.01)
    *H01M 4/86*      (2006.01)
    *H01M 4/88*      (2006.01)
    *H01M 8/1018*    (2016.01)

(52) U.S. Cl.
    CPC ........... *H01M 4/8825* (2013.01); *H01M 4/92* (2013.01); *H01M 4/926* (2013.01); *H01M 8/1039* (2013.01); *H01M 8/1041* (2013.01); *H01M 2008/1095* (2013.01); *Y02P 70/56* (2015.11)

(58) Field of Classification Search
    CPC .... H01M 4/8605; H01M 4/925; H01M 4/921; H01M 4/92; H01M 4/8825; H01M 4/8652

See application file for complete search history.

(56) References Cited

U.S. PATENT DOCUMENTS

| | | | |
|---|---|---|---|
| 6,277,513 B1 | 8/2001 | Swathirajan et al. | |
| 6,398,858 B1 | 6/2002 | Yu et al. | |
| 6,812,187 B1 | 11/2004 | Pak et al. | |
| 8,114,372 B2 | 2/2012 | Pak et al. | |
| 9,156,694 B2 | 10/2015 | Morishita | |
| 2002/0019308 A1 | 2/2002 | Hitomi et al. | |
| 2003/0045425 A1 | 3/2003 | Ruth et al. | |
| 2003/0104936 A1 | 6/2003 | Mao et al. | |
| 2003/0108481 A1 | 6/2003 | Igarashi et al. | |
| 2004/0131919 A1 | 7/2004 | Yasumoto et al. | |
| 2004/0248730 A1 | 12/2004 | Kim et al. | |
| 2005/0095465 A1 | 5/2005 | Tanaka et al. | |
| 2005/0227862 A1 | 10/2005 | Cao et al. | |
| 2005/0282061 A1 | 12/2005 | Campbell | |
| 2006/0051657 A1 | 3/2006 | Terada et al. | |
| 2006/0093893 A1 | 5/2006 | Matsuo et al. | |
| 2006/0099139 A1 | 5/2006 | Webster Long et al. | |
| 2006/0105232 A1 | 5/2006 | Tanuma | |
| 2007/0122334 A1 | 5/2007 | Pak et al. | |
| 2007/0224479 A1 | 9/2007 | Takokoro et al. | |
| 2008/0160391 A1 | 7/2008 | Joo et al. | |
| 2008/0182745 A1 | 7/2008 | Finkelshtain et al. | |
| 2008/0207442 A1 | 8/2008 | Pfeifer et al. | |
| 2009/0047559 A1 | 2/2009 | Terada et al. | |
| 2010/0092830 A1 | 4/2010 | Hayashi et al. | |
| 2011/0058308 A1 | 3/2011 | Nishi et al. | |
| 2011/0097583 A1 | 4/2011 | Tenninson et al. | |
| 2011/0223494 A1* | 9/2011 | Feaver ............... | H01M 4/8615 429/405 |
| 2011/0318254 A1 | 12/2011 | Morishita | |
| 2012/0100461 A1 | 4/2012 | Iden et al. | |
| 2012/0149545 A1 | 6/2012 | Takahashi et al. | |
| 2013/0244137 A1 | 9/2013 | Tada et al. | |
| 2014/0199609 A1 | 7/2014 | Iden et al. | |
| 2014/0287344 A1 | 9/2014 | Suzue et al. | |
| 2015/0352522 A1 | 12/2015 | Mizuuchi et al. | |
| 2016/0064744 A1 | 3/2016 | Mashio et al. | |
| 2016/0072133 A1 | 3/2016 | Akizuki et al. | |
| 2016/0072134 A1 | 3/2016 | Ohma et al. | |
| 2016/0079605 A1 | 3/2016 | Mashio et al. | |
| 2016/0079606 A1 | 3/2016 | Mashio et al. | |
| 2016/0087281 A1 | 3/2016 | Mashio et al. | |

FOREIGN PATENT DOCUMENTS

| | | |
|---|---|---|
| JP | 61-050639 A | 3/1986 |
| JP | 05-345130 A | 12/1993 |
| JP | 06-196171 A | 7/1994 |
| JP | 09-257687 A | 10/1997 |
| JP | 2001-157841 A | 6/2001 |
| JP | 2001-300324 A | 10/2001 |
| JP | 2003-201417 A | 7/2003 |
| JP | 2004-025024 A | 1/2004 |
| JP | 2004-217507 A | 8/2004 |
| JP | 2005-135817 A | 5/2005 |
| JP | 2005-515063 A | 5/2005 |
| JP | 2006-155921 A | 6/2006 |
| JP | 2006-156154 A | 6/2006 |
| JP | 2007-220384 A | 8/2007 |
| JP | 2007-250274 A | 9/2007 |
| JP | 2007-532288 A | 11/2007 |
| JP | 2008-517750 A | 5/2008 |
| JP | 2008-269850 A | 11/2008 |
| JP | 2009-035598 A | 2/2009 |
| JP | 2010-015970 A | 1/2010 |
| JP | 2010-208887 A | 9/2010 |
| JP | 2011-119209 A | 6/2011 |
| JP | 4715842 B2 | 7/2011 |
| JP | 2012-124001 A | 6/2012 |
| JP | 2012-174623 A | 9/2012 |
| JP | 2013-109856 A | 6/2013 |
| JP | 2013-131420 A | 7/2013 |
| WO | WO-2005/083818 A1 | 9/2005 |
| WO | WO-2006/045606 A1 | 5/2006 |
| WO | WO-2009/075264 A1 | 6/2009 |
| WO | WO-2010/143311 A1 | 12/2010 |
| WO | WO 2012/053638 A1 | 4/2012 |
| WO | WO-2012/077598 A1 | 6/2012 |
| WO | WO-2014/129597 A1 | 8/2014 |
| WO | WO 2014/175098 A1 | 10/2014 |
| WO | WO 2014/175107 A1 | 10/2014 |

OTHER PUBLICATIONS

Ma et al. F NMR Studies of Nafion Iononner Adsorption on PEMFC Catalysts and Supporting Carbons. Solid Stat Ionic. vol. 178. Issue 29-30. Dec. 2007, p. 1568-1575.*

Xue Liu et al., "Graphene supported platinum nanoparticles as anode electrocatalyst for direct borohydride fuel cell," International Journal of Hydrogen Energy, vol. 37, No. 23, Dec. 1, 2012, pp. 17984-17991, XP055410279.

Antolini et al., Carbon Supports for Low-Temperature Fuel Cell Catalysts, Applied Catalysis B: Environmental, vol. 88, No. 1-2, Apr. 29, 2009, pp. 1-24.

English translation of JP 2007-250574 A—2007.

Environment Conscious New Material Series, Fuel Cell Material, published by Nikkan Kogyo Shimbum Ltd., 2007, 1st Edition, pp. 109-111.

European Extended Search Report, dated Oct. 6, 2017, 11 pages.

Soboleva, T. et al., "On the Micro~, Meso~, and Macroporous Structures of Polymer Electrolyte Membrane Fuel Cell Catalyst Layers", ACS Applied Materials and Interfaces, vol. 2, No. 2, (Feb. 24, 2010), pp. 375-384.

Vol'fkovich, Yu. M, et al., Porous Structure of the Catalyst Layers of Electrodes in a Proton-Exchange Membrane Fuel Cell: A Stage-by-Stage Study, Russian Journal of Electrochemistry, vol. 46, No. 3, (Mar. 2010), pp. 336-344.

Xiaoming Ren et al., Oxygen Reduction Reaction Catalyst on Lithium/Air Battery Discharge Performance, Journal of Materials Chemistry, Vo. 21, No. 27, Jan. 1, 2011, pp. 10118-10125.

USPTO Office Action, U.S. Appl. No. 14/786,056, dated Jul. 17, 2018, 16 pages.

USPTO Office Action, U.S. Appl. No. 14/786,281, dated Jul. 6, 2018, 15 pages.

USPTO Office Action, U.S. Appl. No. 14/786,479, dated Jun. 4, 2018, 10 pages.

USPTO Office Action, U.S. Appl. No. 14/786,675, dated Jun. 1, 2018, 8 pages.

(56) References Cited

OTHER PUBLICATIONS

"Vulcan XC72R," Cabot Corporation, URL:http://search.proquest.com/docview/884297145, Nov. 30, 2002.

USPTO Notice of Allowance, U.S. Appl. No. 14/786,056, dated Mar. 8, 2018, 8 pages.

Wang et al: "Investigation of carbon corrosion in polymer electrolyte fuel cells using steam etching," Materials Chemistry and Physics, Switzerland, Oct. 1, 2010, vol. 123, No. 2-3, pp. 761-766.

USPTO Office Action, U.S. Appl. No. 14/786,479, dated Oct. 17, 2018, 16 pages.

Baizeng Fang et al., Ordered Hierarchical Nanostructured Carbon as a Highly Efficient Cathode Catalyst Support in Proton Exchange Membrance Fuel Cell, Chemistry of Materials, 21 (5), 2009, pp. 789-796.

USPTO Office Action, U.S. Appl. No. 14/786,281, dated Nov. 2, 2018, 13 pages.

USPTO Office Action, U.S. Appl. No. 14/786,056, dated Nov. 16, 2018, 13 pages.

USPTO Office Action, U.S. Appl. No. 14/786,675, dated Nov. 26, 2018, 8P pages.

Fan Xu et al., Investigation of the Carbon Corrosion Process for Polymer Electrolyte Fuel Cells Using a Rotating Disk Electrode Technique, Purdue e-Pubs, Purdue University, Paper 652, Birck and NCN Publications, 2010, 10 pages.

USPTO Advisory Action, U.S. Appl. No. 14/786,056, dated Mar. 20, 2019, 3 pages.

USPTO Office Action, U.S. Appl. No. 14/786,056, dated May 2, 2019, 13 pages.

USPTO Office Action, U.S. Appl. No. 14/786,479, dated May 2, 2019, 11 pages.

* cited by examiner

ELECTRODE CATALYST LAYER FOR FUEL CELL, METHOD FOR PRODUCING THE SAME, AND MEMBRANE ELECTRODE ASSEMBLY AND FUEL CELL USING THE CATALYST LAYER

TECHNICAL FIELD

The present invention relates to an electrode catalyst layer for fuel cell, a method for producing the same, a membrane electrode assembly and a fuel cell using the catalyst layer.

BACKGROUND TECHNOLOGY

A polymer electrolyte fuel cell using a proton-conductive solid polymer membrane operates at a low temperature, as compared with other types of fuel cells such as a solid oxide fuel cell and a molten carbonate fuel cell. Therefore, the polymer electrolyte fuel cell is expected to be used for a stationary power supply or a power source for a mobile unit such as an automobile, and has started to be practically used.

In the polymer electrolyte fuel cell as described above, an expensive metal catalyst as represented by Pt (platinum) and Pt alloy is generally used, and causes increased cost of the fuel cell. Therefore, the development of the technology that can reduce cost of a fuel cell by reducing the use amount of a noble metal catalyst has been required.

For example, Patent Document 1 discloses an electrode catalyst having catalytic metal particles carried on a conductive carrier wherein an average particle size of the catalytic metal particles is larger than an average pore size of micropores in the conductive carrier. Patent Document 1 describes that this configuration can prevent the catalytic metal particles from entering the micropores in the carrier to increase a ratio of catalytic metal particles used in three-phase boundary and to improve the utilization efficiency of an expensive noble metal.

PRIOR ART DOCUMENTS

Patent Document

Patent Document 1: Japanese Patent Application Publication No. 2007-250274 (corresponding to US Patent Application Publication No. 2009/0047559)

SUMMARY

However, the electrode catalyst layer using the catalyst disclosed in the Patent Document 1 has had a problem that an electrolyte and catalytic metal particles contact each other, to induce decrease in catalytic activity. In regards to such problem, when a catalytic metal is carried in the fine pores of the carrier into which an electrolyte cannot enter so as to prevent contact between an electrolyte and catalytic metal particles, a transport distance of gas such as oxygen is increased, and gas transportability is lowered. As a result, there has been a problem that a sufficient catalytic activity cannot be elicited, and catalytic performance is deteriorated under high load conditions.

Therefore, the present invention has been made in consideration of the circumstances as described above, and an object of the present invention is to provide an electrode catalyst layer for fuel cell excellent in gas transportability.

Another object of the present invention is to provide an electrode catalyst layer for fuel cell excellent in catalytic activity.

Even another object of the present invention is to provide a membrane electrode assembly and a fuel cell excellent in power generation performance.

The present inventors have made a diligent study to solve the problems mentioned above, to find that the above problems can be solved by supplying a reaction gas (especially $O_2$) directly to a catalytic metal without partially interposing an electrolyte. The present invention has been completed.

MODE FOR CARRYING OUT THE INVENTION

The electrode catalyst layer for fuel cell of the present invention (herein also referred to as "electrode catalyst layer" or "catalyst layer") includes a catalyst comprising a catalyst carrier and a catalytic metal carried on the catalyst carrier, and an electrolyte. Here, the catalytic metal is disposed so as to directly contact a reaction gas without interposing an electrolyte, in a ratio so that a specific surface area of the catalytic metal which gas can reach without passing through an electrolyte is 50% or more, with respect to the total specific surface area of the catalytic metal. In the catalyst layer having such a configuration, the specific surface area of the catalytic metal which a reaction gas can reach even without passing through an electrolyte is adjusted in an appropriate range so that a transport path, which directly supplies a reaction gas (especially $O_2$) without interposing the electrolyte, is secured to improve gas transportability. As a result, a catalyst layer having excellent catalytic activity can be provided. Incidentally, in the present Description, "/g carrier" means "per 1 g of carrier." Similarly, "/g catalytic metal" means "per 1 g of catalytic metal."

Figure 2:
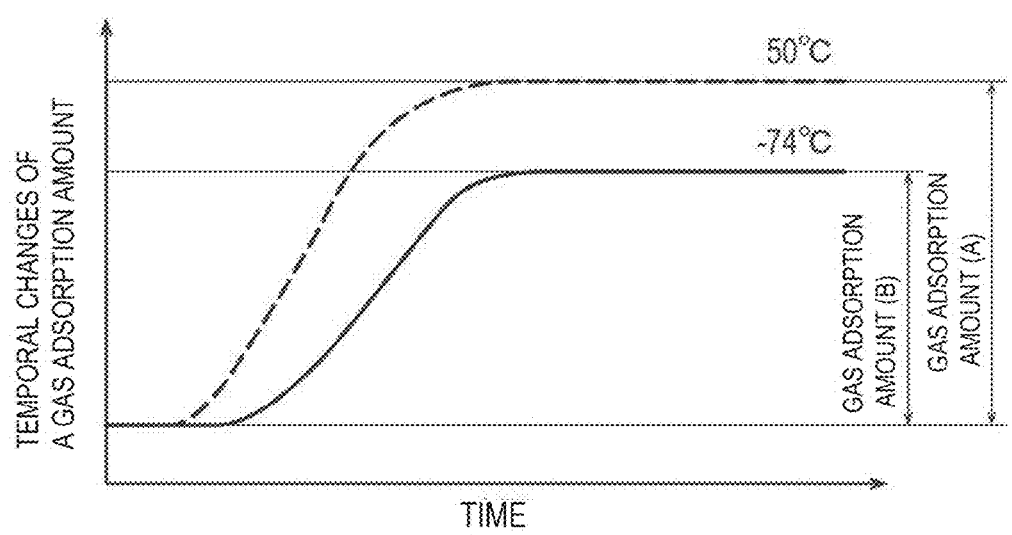
FIG. 2 schematically shows temporal changes of a gas adsorption amount (A) and a gas adsorption amount (B) at the time of measuring a gas adsorption amount.

In the electrode catalyst layer described in Patent Document 1, in order to sufficiently secure three-phase boundary at which a reaction gas, a catalytic metal and an electrolyte (electrolyte polymer) are simultaneously present, the electrolyte and catalytic particles are considerably allowed to contact each other on the conductive carrier (for example, FIG. 2). However, the present inventors have found that since a major part of the reaction gas (especially $O_2$) is transported to the catalytic metal through the electrolyte in the above configuration, gas transport resistance is high, a sufficient amount of reaction gas cannot reach the catalytic metal, and the catalyst cannot exhibit sufficient activity. The present inventors have intensively studied for the solution of the above problem, and consequently found that three-phase boundary (reaction site) are formed by a reaction gas, a catalytic metal and water, whereby the catalyst can be effectively utilized. Therefore, by supplying a reaction gas directly to a catalytic metal without interposing the electrolyte in a certain ratio or more, the reaction gas (especially $O_2$) can be more rapidly and more efficiently transported to a catalytic metal (gas transport resistance can be reduced). By the improvement in gas transportability as above, a catalytic metal can effectively utilize the reaction gas, and the catalytic activity can be improved. Namely, the catalytic reaction can be promoted. In addition, the effects can be effectively exhibited even under high load conditions. Therefore, a membrane electrode assembly and a fuel cell having the catalyst layer of the present invention can show high current-voltage (iV) characteristics (suppress voltage drop at high current density), and are excellent in power generation performance. The above mechanism is estimated, and the present invention is not limited thereby.

Therefore, the catalyst layer of the present invention is excellent in gas transportability, and allows a reaction gas to rapidly and efficiently transport to a catalytic metal. Thus, the catalyst layer of the present invention can exhibit high catalytic activity, namely, the catalytic reaction can be promoted. Therefore, a membrane electrode assembly and a fuel cell having the catalyst layer of the present invention are excellent in power generation performance. Therefore, the present invention also provides a membrane electrode assembly and a fuel cell having the catalyst layer of the present invention.

Hereinbelow, an embodiment of the catalyst of the present invention, and an embodiment of the electrode catalyst layer, the membrane electrode assembly ("MEA") and the fuel cell using the same will be described in detail while properly referring to the drawings. However, the present invention is not limited only to the following embodiments. Each drawing is exaggeratedly expressed for convenience of explanation, and dimensional ratios of each constituent in each drawing may be different from an actual ratio. Also, when the embodiment of the present invention is described while referring to the drawings, the same element is denoted by the same reference in the description of the drawings, and the duplicated description is omitted.

In the Description, "X to Y" showing a range means "X or more and Y or less". Also, unless otherwise noted, operations and measurement of physical properties and the like are performed under the conditions of room temperature (20 to 25° C.)/relative humidity of 40 to 50%.

[Fuel Cell]

A fuel cell comprises a membrane electrode assembly ("MEA") and a pair of separators comprising an anode side separator having a fuel gas passage for the fuel gas to pass through and a cathode side separator having an oxidant gas passage for the oxidant gas to pass through. The fuel cell of this embodiment can exhibit high power generation performance.

Figure 1:
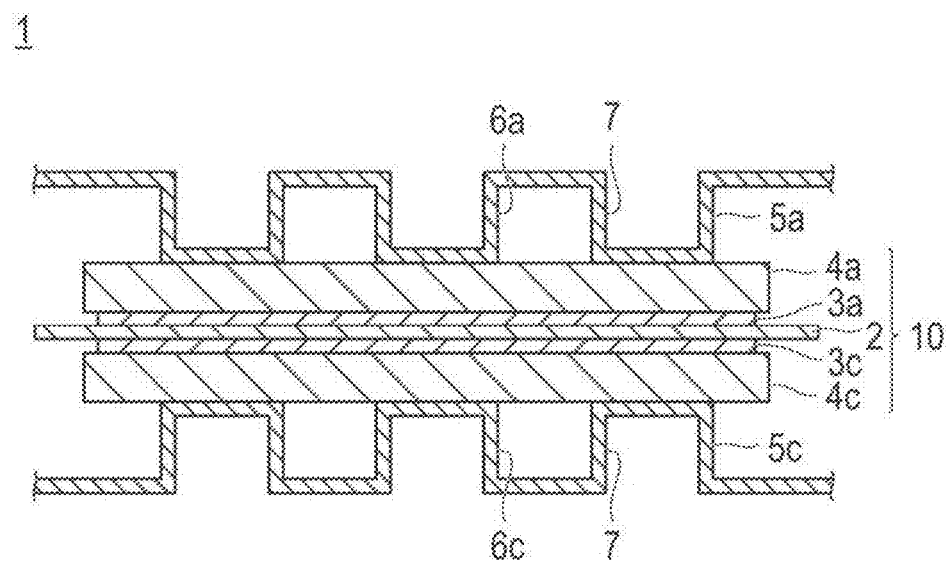
FIG. 1 is a schematic cross-sectional view showing a basic configuration of the polymer electrolyte fuel cell according to an embodiment of the present invention.

FIG. 1 is a schematic view showing a basic configuration of a polymer electrolyte fuel cell ("PEFC") 1 according to an embodiment of the present invention. The PEFC 1 has a solid polyelectrolyte membrane 2, and a pair of catalyst layers (an anode catalyst layer 3a and a cathode catalyst layer 3c) that sandwich it. Moreover, the laminated body (CCM) of the solid polyelectrolyte membrane 2 and the catalyst layers (3a and 3c) is further sandwiched by a pair of gas diffusion layers ("GDL") (an anode gas diffusion layer 4a and a cathode gas diffusion layer 4c). As described above, the solid polyelectrolyte membrane 2, a pair of the catalyst layers (3a and 3c) and a pair of the gas diffusion layers (4a and 4c) constitute a membrane electrode assembly ("MEA") 10 in a laminated state.

In the PEFC 1, the MEA 10 is further sandwiched by a pair of separators (an anode separator 5a and a cathode separator 5c). In FIG. 1, the separators (5a and 5c) are shown as being located on both ends of the illustrated MEA 10. However, in a fuel cell stack in which a plurality of MEAs is stacked up, the separators are also generally used as the separators for the adjacent PEFC (not shown). In other words, the MEAs form a stack by sequentially laminated via the separators in a fuel cell stack. Moreover, in an actual fuel cell stack, gas sealing parts are provided between the separators (5a and 5c) and the solid polyelectrolyte membrane 2 as well as between the PEFC 1 and other PEFCs that are located adjacent to it, but such arrangements are omitted in FIG. 1.

The separators (5a and 5c) are obtained by, for example, applying a press forming process to thin plates with a thickness of 0.5 mm or less, forming a corrugating shape as shown in FIG. 1. The convex areas of the separators (5a and 5c) as seen from the MEA side are in contact with the MEA 10. This provides a secure electrical connection with the MEA 10. Also, the concave areas of the separators (5a and 5c) as seen from the MEA side (the space between the separators and the MEA generated due to a corrugating shape of the separators) serve as a gas passages for the gas to pass through during the operation of the PEFC 1. Specifically, the fuel gas (e.g., hydrogen) is allowed to pass through the gas passage Ga of the anode separator 5a, and the oxidant gas (e.g., air) is allowed to pass through the gas passage 6c of the cathode separator 5c.

On the other hand, the concave areas of the separators (5a and 5c) as seen from the opposite side of the MEA side serve as a refrigerant passage 7 for allowing the refrigerant (e.g., water) for cooling the PEFC to pass through during the operation of the PEFC 1. Moreover, a manifold (not shown) is normally provided in the separator. The manifold serves as a connecting means for connecting each cell when the stack is formed. With such a configuration, the fuel cell stack's mechanical strength is secured.

In the embodiment shown in FIG. 1, the separators (5a and 5c) are formed in a corrugating shape. However, it should not be construed that the separator always takes such a corrugating shape, but rather it can have any arbitrary shape including a flat shape or a partially corrugating shape so long as it can provide a function of the gas passage or the refrigerant passage.

The fuel cell having MEA according to this embodiment as described above exhibits excellent power generation performance. The kind of the fuel cell is not particularly limited. Although the polymer electrolyte fuel cell is used as an example of the type of the fuel cell in the foregoing description, the type of the fuel cell includes alkaline fuel cell, direct methanol fuel cell, and micro fuel cell, besides this. Among them, the polymer electrolyte fuel cell (PEFC) is most favorable as it can be built compact, and provide high density and high power output. Furthermore, the fuel cell is suitable not only as a power supply for a mobile unit such as a motor vehicle where the installation space is limit, but also as a stationary power supply. Among them, it is particularly suitable for use as a power supply for a mobile unit such as an automobile where high output voltage is required after stopping operation for a relatively long time.

The fuel to be used for operating the fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, diethylene glycol and the like can be used. Of these, hydrogen and methanol are favorably used as they can provide high output power.

Moreover, the application use of a fuel cell is not particularly limited, but the application to a motor vehicle is preferable. The electrolyte membrane-electrode assembly of the present invention is excellent in power generation performance and durability, and miniaturization can be realized. Therefore, the fuel cell of the present invention is particularly effective when the fuel cell is applied to a motor vehicle, from the viewpoint of vehicle mountability. Accordingly, the present invention provides a motor vehicle comprising the fuel cell of the present invention.

Although the members that constitute the fuel cell of this configuration will be briefly described below, the technical scope of the present invention should not be construed to be confined to limited by the configuration described below.

[Electrode Catalyst Layer (Catalyst Layer)]

The electrode catalyst layer (catalyst layer) of the present invention includes a catalyst comprising a catalyst carrier and a catalytic metal carried on the catalyst carrier, and an electrolyte. In the present invention, a catalytic metal is disposed so as to directly contact a reaction gas without interposing an electrolyte, so that the specific surface area of the catalytic metal which gas can reach even without passing through the electrolyte is 50% or more, with respect to the total specific surface area of the catalytic metal. The catalytic metal is exposed without being coated with the electrolyte in such a ratio, thereby reducing gas transport resistance, and a reaction gas (especially $O_2$) can be supplied directly to the catalytic metal without interposing the electrolyte. Also, when the reaction gas is supplied to the catalytic metal without interposing the electrolyte as described above, a time for transporting the reaction gas (especially $O_2$) to the catalytic metal can be shortened. Therefore, the catalytic metal can more rapidly use the reaction gas. Thus, the catalyst layer of the present invention can more effectively use the catalyst and improve catalytic activity, namely, the catalytic reaction can be promoted. As used herein, the ratio of the specific surface area of the catalytic metal which gas can reach even without passing through an electrolyte, with respect to the total specific surface area of the catalytic metal, is simply also referred to as the "exposure ratio of catalytic metal".

In the electrode catalyst layer of the present invention, a catalytic metal is directly brought into contact with a reaction gas without interposing an electrolyte with a specific exposure ratio of catalytic metal (a catalyst is partially coated with an electrolyte with a specific exposure ratio of catalytic metal). Here, the coated form of the catalyst with the electrolyte (exposure form of catalytic metal) is not particularly limited. Specifically, the part where the catalyst is coated with the electrolyte may be either form of one portion (a form where less than 50% of the surface of the catalyst is coated with the electrolyte in one portion, and the electrolyte is not present in the remaining part) or divided into a plurality of portions (a form where less than 50% of the surface of the catalyst is coated with the electrolyte separately in a plurality of portions, and the electrolyte is not present in the remaining part). Alternatively, an agglomerate of the catalyst may be coated with the electrolyte.

As to the relationship between the electrolyte and the catalytic metal, it is not particularly limited so long as the exposure ratio of catalytic metal is 50% or more. Therefore, the catalytic metal may be present or may not be present in the part where the catalyst is coated with the electrolyte.

Furthermore, as described in detail below, it is preferable that the catalyst has pores with a radius of 1 nm or more (mesopores). In this case, the electrolyte may either coat the catalyst so as to coat the mesopore opening (entrance), or coat the catalyst so as to expose the mesopore opening (entrance) (the pore opening is not coated with the electrolyte). Here, when the catalyst has mesopores, a form in which at least a part of the catalytic metal is carried (stored) inside the mesopores is preferable. When the pore opening of the catalyst is not coated with the electrolyte, a reaction gas is supplied directly to the catalytic metal carried inside the pores without interposing the electrolyte. Therefore, transport resistance of a reaction gas to the catalytic metal inside the pores can be further reduced, and a reaction gas (especially $O_2$) is more rapidly and more efficiently transported to the catalyst, and thus a catalytic reaction can be more effectively promoted. Accordingly, the mesopore opening (entrance) of the catalyst is preferably not coated with the electrolyte.

As described above, the ratio of the specific surface area of the catalytic metal which gas can reach even without passing through the electrolyte, with respect to the total specific surface area of the catalytic metal (exposure ratio of catalytic metal) is 50% or more, and larger values in the following order of 55% or more, 60% or more, 65% or more, 80% or more, 90% or more, 93% or more, and 95% or more are preferable. By the exposure ratio of catalytic metal described above, coating of the catalytic metal with an electrolyte can be reduced, and a reaction gas (especially $O_2$) can be further more rapidly and more efficiently supplied directly to a catalytic metal without interposing an electrolyte, and thus gas transportability can be further improved. When the exposure ratio of catalytic metal is 80% or more, improvement in gas transportability is particularly significant. In an embodiment of the present invention, an electrode catalyst layer for fuel cell is provided in which a specific surface area of the catalytic metal which gas can reach even without passing through an electrolyte is 80% or more, with respect to the total specific surface area of the catalytic metal. The upper limit of the ratio of the specific surface area of the catalytic metal which gas can reach even without passing through the electrolyte (exposure ratio of catalytic metal) is not particularly limited since the higher the more preferable, and is 100%.

The principle and method of measuring the exposure ratio of catalytic metal will be described below in more detail. Incidentally, in the present Description, the "catalytic metal which gas can reach even without passing through an electrolyte" is also referred to as the "catalytic metal exposed on the catalyst carrier". In addition, the "specific surface area of the catalytic metal which gas can reach even without passing through an electrolyte with respect to the total specific surface area of the catalytic metal" is also referred to as a "ratio of a specific surface area (B) of the catalytic metal exposed on the catalyst carrier to a specific surface area (A) of the total catalytic metal" or an "exposure ratio of catalytic metal".

It is known that a noble metal such as platinum which is conventionally used as the catalytic metal adsorbs some kind of gas. Examples of gas which is adsorbed to the noble metal include carbon monoxide (CO); volatile sulfur-containing compounds (for example, sulfur oxide ($SO_x$) such as sulfur dioxide ($SO_2$), mercaptan such as methanethiol, and hydrogen sulfide ($H_2S$)); and nitrogen oxide ($NO_x$) such as nitric monoxide (NO).

Herein, the ratio of the gas adsorption amount (B) of the catalytic metal exposed on the catalyst carrier to the gas adsorption amount (A) of the total catalytic metal can be calculated as the specific surface area (B) of the catalytic metal exposed on the catalyst carrier with respect to the specific surface area (A) of the total catalytic metal. The gas adsorption amount of the catalytic metal is in a proportional relationship with the specific surface area of the catalytic metal, and thus the exposure ratio of catalytic metal can be calculated considering the gas adsorption amount of the catalytic metal as the specific surface area of the catalytic metal by the following equation (1).

[Equation 1]

$$\text{Exposure Rate of Catalytic Metal (\%)} = \{\text{Gas Adsorption Amount } (B)(\text{cm}^3/\text{g catalytic metal})/\text{Gas Adsorption Amount } (A)(\text{cm}^3/\text{g catalytic metal})\} \times 100 = \{\text{Specific Surface Area } (B)(\text{m}^2/\text{g catalytic metal})/\text{Specific Surface Area } (A)(\text{m}^2/\text{g catalytic metal})\} \times 100 \quad \text{Equation (1)}$$

In the equation (1), the "gas adsorption amount (A) of the total catalytic metal" ("gas adsorption amount (A)") is the gas adsorption amount of the total catalytic metal carried on a catalyst carrier. That is, the gas adsorption amount (A) ($\text{cm}^3$/g catalytic metal) is the total amount of the gas adsorption amount of the catalytic metal exposed on the catalyst carrier (not coated with the electrolyte) and the gas adsorption amount of the catalytic metal coated with the electrolyte. In addition, in the equation (1), the "gas adsorption amount (B) of the catalytic metal exposed on the catalyst carrier" ("gas adsorption amount (B)") is the gas adsorption amount of the catalytic metal exposed on the catalyst carrier (not coated with the electrolyte) ($\text{cm}^3$/g catalytic metal).

In accordance with an aspect of the present invention, there is provided a method of measuring the gas adsorption amount (A) of the total catalytic metal and the gas adsorption amount (B) of the catalytic metal exposed on the catalyst carrier by using an electrode catalyst layer for fuel cell including a catalyst comprising a catalyst carrier and a catalytic metal carried on the catalyst carrier, and an electrolyte, or using a membrane catalyst layer assembly or membrane electrode assembly including the electrode catalyst layer for fuel cell and evaluating the exposure ratio of catalytic metal by using the equation (1) or the following equation (2). The method is a method for inspecting an electrode catalyst layer for fuel cell, the method including: measuring the gas adsorption amount (A) of the total catalytic metal and the gas adsorption amount (B) of the catalytic metal exposed on the catalyst carrier by using an electrode catalyst layer for fuel cell including a catalyst comprising a catalyst carrier and a catalytic metal carried on the catalyst carrier, and an electrolyte, or a membrane catalyst layer assembly or membrane electrode assembly including the electrode catalyst layer for fuel cell; and evaluating the exposure ratio of catalytic metal by using the equation (1) or the following equation (2). In an embodiment of the present invention, there is provided a method for producing a fuel cell, the method including a step of evaluating the exposure ratio of catalytic metal by using the above-described method. For example, in J. Electroanal. Chem., 693 (2013) 34-41, an ionomer (electrolyte) coating rate of the catalytic metal is obtained by an electrochemical method. Therefore, unless the electrolyte and the catalytic metal or the electrolyte and the catalyst carrier are in direct contact with each other, the electrical double layer capacitance (Cdl) cannot be detected. For example, in the catalyst coated with the electrolyte, when air bubbles are formed in the membrane coated with the electrolyte, the catalytic metal disposed in the air bubbles is not in contact with the electrolyte. In addition thereto, when the catalyst has pores (mesopores) which can contain the catalytic metal, the catalytic metal carried (stored) inside the pores in which the opening is coated with the electrolyte is not in contact with the electrolyte. In this case, the metal catalyst present in the air bubbles or pores is coated with the electrolyte, and thus gas access is inhibited. Nevertheless, the specific surface area corresponding to the catalytic metal which is not in contact with the electrolyte cannot be detected by an electrochemical technique. On the other hand, in the evaluation method according to the aspect of the present invention, the ratio of the specific surface area of the catalytic metal which gas can reach even without passing through an electrolyte to the specific surface area of the total catalytic metal (the exposure ratio of catalytic metal) is evaluated by measuring the gas adsorption amount. According to this, the microstructure can be evaluated in consideration of the access of the metal catalyst to gas. Therefore, even in the catalyst layer having the microstructure in which the electrolyte and the catalytic metal are not in direct contact with each other like a case where the catalytic metal is present in air bubbles or pores, the microstructure can be detected as the catalytic metal area coated with the electrolyte and the catalyst performance (for example, power generation performance) can be predicted with high accuracy. According to the measurement method of the aspect of the present invention, it is possible to provide a performance evaluation method of the electrode catalyst layer in consideration of the access of the metal catalyst to gas.

In the evaluation method according to the aspect of the present invention, an adsorptive gas such as carbon monoxide, a volatile sulfur-containing compound, or nitrogen oxide is contained, for example, in a ratio of 1 to 100% (v/v) with respect to the total measurement gas. In an embodiment, a measurement gas containing one or more selected from 1 to 100% (v/v) of the adsorptive gas and one or more selected from the group consisting of the remaining helium, nitrogen, and argon is used. In the case of a mixed gas, from the viewpoint of the signal intensity of the adsorptive gas, the adsorptive gas may be more preferably contained in a ratio of 2 to 40% (v/v) with respect to the total mixed gas. That is, a measurement gas containing one or more of 2 to 40% (v/v) of the adsorptive gas and one or more selected from the group consisting of the remaining of helium, nitrogen, and argon may be used. When the catalytic metal being platinum or containing platinum and a metal component other than platinum is used, a gas to be used for measurement preferably contains carbon monoxide (CO). The measurement gas to be used for measuring the gas adsorption amount (A) and the measurement gas to be used for measuring the gas adsorption amount (B) have generally the same composition.

In the equation (1), the gas adsorption amount (A) is measured in the temperature condition in which molecular movement of the electrolyte is active such that gas can pass through the electrolyte. The molecular movement of the electrolyte becomes active by increasing the temperature of the electrolyte and the molecular movement is suppressed by decreasing the temperature. Therefore, a value of the gas adsorption amount (A) can be obtained by measuring the gas adsorption amount of the catalytic metal in the condition of a high temperature (for example, 50° C.). The temperature at which the gas adsorption amount (A) is measured (the temperature of the electrode catalyst layer for fuel cell) cannot be generally defined since the temperature varies depending on the contained electrolyte, but, for example, the temperature is higher than 0° C. and 120° C. or lower. The measurement of the gas adsorption amount (A) is performed, for example, under atmosphere pressure.

In the equation (1), the gas adsorption amount (B) is measured in the temperature condition in which the molecular movement of the electrolyte is suppressed such that the electrolyte does not allow the gas to pass therethrough. Therefore, a value of the gas adsorption amount (B) can be obtained by measuring the gas adsorption amount of the catalytic metal in the condition of a low temperature (for example, −74° C.). The temperature at which the gas adsorption amount (B) is measured (the temperature of the electrode catalyst layer for fuel cell to be used) cannot be generally defined since the temperature varies depending on the contained electrolyte, but, for example, the temperature is a temperature lower than the temperature at which the gas adsorption amount (A) is measured. More specifically, the temperature at which the gas adsorption amount (B) is measured is, for example, −150 to 0° C. The measurement of the gas adsorption amount (B) is performed, for example, under atmosphere pressure.

In an embodiment, a temperature $T_{(A)}$ (° C.) at which the gas adsorption amount (A) is measured and a temperature $T_{(B)}$ (° C.) at which the gas adsorption amount (B) is measured satisfy $80 \leq T_{(A)}$ (° C.)$-T_{(B)}$(° C.)$\leq 270$.

The ratio of the specific surface area of the catalytic metal which gas can reach even without passing through the electrolyte (exposure ratio of catalytic metal) described for the electrode catalyst layer for fuel cell, as used herein, is a value measured by the following CO adsorption method. The following method is a method obtained by embodying the evaluation method according to the aspect of the present invention in more detail and uses selective adsorption of carbon monoxide (CO) onto a catalytic metal (for example, platinum), and uses the following mechanism. To be specific, carbon monoxide (CO) passes through an electrolyte at 50° C. Therefore, at 50° C., CO chemically adsorbs to both the catalytic metal exposed on the catalyst carrier (not coated with the electrolyte) and the catalytic metal coated with the electrolyte. On the other hand, carbon monoxide (CO) does not pass through the electrolyte at low temperature (for example, −74° C.). Therefore, at low temperature (for example, −74° C.), CO chemically adsorbs to the catalytic metal exposed on the catalyst carrier (not coated with the electrolyte), but does not chemically adsorb to the catalytic metal coated with the electrolyte and the catalytic metal carried (stored) inside pores (for example, mesopores) which opening is coated with the electrolyte. Namely, the specific surface area of the catalytic metal of the catalyst layer as measured by the CO adsorption method at 50° C. ($COSMA_{50° C.}$) (m²/g catalytic metal) corresponds to a total specific surface area of a catalytic metal. The specific surface area of the catalytic metal of the catalyst layer as measured by the CO adsorption method at −74° C. ($COSMA_{-74° C.}$) (m²/g catalytic metal) corresponds to a specific surface area of a catalytic metal which gas can reach even without passing through the electrolyte. Therefore, $COSMA_{50° C.}$ (m²/g catalytic metal) and $COSMA_{-74° C.}$ (m²/g catalytic metal) are measured by the following CO adsorption method, and the exposure ratio of catalytic metal (%) is obtained from the obtained values by the following equation (2). The smaller the exposure ratio of catalytic metal (%) means the larger ratio of the catalytic metal coated with the electrolyte. In addition, the "CO adsorption method" refers to a method in which carbon monoxide is used as the adsorptive gas, the measurement temperature of the gas adsorption amount (A) is 50° C., and the measurement temperature of the gas adsorption amount (B) is −74° C. among the evaluation methods of the exposure ratio of catalytic metal which uses the gas adsorption amount (A) and the gas adsorption amount (B).

[Equation 2]

$$\text{Exposure Rate of Catalytic Metal (\%)} = \frac{COSMA_{-74° C.}(m^2/g)}{COSMA_{50° C.}(m^2/g)} \times 100 \qquad \text{Equation (2)}$$

(Method for Measuring Specific Surface Area of Catalytic Metal by CO Adsorption Method)

A sample (for example, catalyst layer) is dried in a vacuum oven at 100° C. for 5 hours or more. After drying for a predetermined time, the sample is cooled to room temperature (25° C.). Thereafter, about 100 mg is weighed and put into an I-shaped tube. Thereafter, a hydrogen gas is purged at room temperature (25° C.) for 10 minutes. Under a hydrogen gas flow, the temperature of the sample is raised to 100° C. in 20 minutes. Thereafter, the sample is retained at 100° C. for 15 minutes in a hydrogen atmosphere. Next, the flowing gas is replaced with a helium gas, and the sample is retained therein at a temperature of 100° C. for 15 minutes. Furthermore, the temperature of the sample is lowered to 50° C. or −74° C., and kept for 15 minutes at this temperature, and CO adsorption amount (m²/g catalytic metal) is measured in accordance with the indication of the measuring device (product name: BELCAT (registered trademark), a temperature control unit: CATCryo, all manufactured by BEL Japan, Inc.). Incidentally, a mixed gas (He:CO=90:10 (v/v)) is used for measurement. The exposure rate of catalytic metal (%) is obtained on the basis of the measured CO adsorption amount by the equation (2).

FIG. 2 schematically shows temporal changes of the gas adsorption amount (A) and the gas adsorption amount (B) at the time of measuring a gas adsorption amount when the measurement at 50° C. and −74° C. is used as an example.

As shown in FIG. 2, the gas adsorption amount gradually increases in the temperature retaining process in which the measurement gas is allowed to pass (in the above description, at 50° C. or −74° C.) and is a constant value at the time point when the gas adsorption amount reach a saturated adsorption amount. In the CO adsorption method, such a saturated adsorption amount is employed as the gas adsorption amount. In addition thereto, the gas adsorption amount is plotted with respect to time from the time point when the sample temperature is decreased to the measurement temperature (in the above description, 50° C. or −74° C.) and the flow of the measurement gas is started, thereby obtaining an integrated gas adsorption amount plot as shown in FIG. 2. Based on the plot, the gas adsorption amount in an arbitrary predetermined time before the gas adsorption amount reaches the saturated adsorption amount may be employed as the gas adsorption amount (A) and the gas adsorption amount (B).

A sample to be used for measuring the exposure ratio of catalytic metal by the gas adsorption amount may be a catalyst coated membrane (CCM) or a membrane electrode assembly (MEA) in addition to the electrode catalyst layer for fuel cell as described above. The electrode catalyst layer for fuel cell may be applied to a substrate and used without any change or may be scraped off and used.

A catalyst layer (for example, an anode catalyst layer) different from a measurement target may be present as a counter electrode of a catalyst layer (for example, a cathode catalyst layer) serving as the measurement target of the gas adsorption amount in the catalyst coated membrane (CCM) or the membrane electrode assembly (MEA) used as the measurement sample. In this case, measurement may be performed while the adsorption of the measurement gas to the catalyst layer (in the above example, the anode catalyst layer) different from the measurement target is prevented. The method of preventing the adsorption of the measurement gas to the catalyst layer different from the measurement target is not particularly limited, and for example, the measurement gas may be prevented from entering the catalyst layer by coating the total catalyst layer different from the measurement target with the polyelectrolyte membrane as described above and transferring the membrane by hot pressing or the like. When the adsorption prevention of the measurement gas by the polyelectrolyte membrane is performed by using the membrane electrode assembly (MEA), the coating with the polyelectrolyte membrane may be performed after the GDL mechanically is peeled from the catalyst layer. According to this, the adsorption of the measurement gas can be prevented by the catalyst layer different from the measurement target.

The catalyst layer of the present invention may be either a cathode catalyst layer or an anode catalyst layer, but is preferably a cathode catalyst layer. As described above, in the catalyst layer of the present invention, a catalyst can be effectively utilized by forming three-phase boundary with water unless the catalyst and the electrolyte contact each other. Water is formed in the cathode catalyst layer.

The catalyst layer essentially comprises a catalyst having a catalytic metal carried on a catalyst carrier, and an electrolyte. The catalyst is not particularly limited.

For example, the catalyst preferably satisfies at least one of the following (a) and (b):

(a) the catalyst has pores with a radius of less than 1 nm and pores with a radius of 1 nm or more, a pore volume of the pores with a radius of less than 1 nm of 0.3 cc/g carrier or more, and the catalytic metal carried inside the pores with a radius of 1 nm or more; and (b) the catalyst has pores with a radius of less than 1 nm and pores with a radius of 1 nm or more, a mode radius of pore distribution of the pores with a radius of less than 1 nm of 0.3 nm or more and less than 1 nm, and the catalytic metal carried inside the pores with a radius of 1 nm or more. In the present Description, a catalyst which satisfies the above (a) is also referred to as "catalyst (a)", and a catalyst which satisfies the above (b) is also referred to as "catalyst (b)".

Instead of or in addition to the preferable embodiment, the catalyst preferably satisfies the following (c):

(c) the catalyst has pores with a radius of 1 nm or more and less than 5 nm, a pore volume of said pores of 0.8 cc/g carrier or more, and a specific surface area of the catalytic metal as electrochemically measured of 60 m²/g carrier or less.

In the present Description, a catalyst which satisfies the above (c) is also referred to as "catalyst (c)".

The catalysts (a) to (c) according to the preferable embodiments will be described in detail hereinbelow.

(Catalysts (a) and (b))

The catalyst (a) contains a catalyst carrier and a catalytic metal carried on the catalyst carrier, and satisfies the following configurations (a-1) to (a-3):

(a-1) the catalyst has pores with a radius of less than 1 nm (primary pores) and pores with a radius of 1 nm or more (primary pores);

(a-2) the catalyst has a pore volume of the pores with a radius of less than 1 nm of 0.3 cc/g carrier or more; and (a-3) the catalyst has the catalytic metal carried inside the pores with a radius of 1 nm or more.

The catalyst (b) contains a catalyst carrier and a catalytic metal carried on the catalyst carrier, and satisfies the following configurations (a-1), (b-1) and (a-3):

(a-1) the catalyst has pores with a radius of less than 1 nm and pores with a radius of 1 nm or more;

(b-1) the catalyst has a mode radius of pore distribution of the pores with a radius of less than 1 nm of 0.3 nm or more and less than 1 nm; and (a-3) the catalyst has the catalytic metal carried inside the pores with a radius of 1 nm or more.

In the present Description, a pore with a radius of less than 1 nm is also referred to as "micropore", and a pore with a radius of 1 nm or more is also referred to as "mesopore".

As described above, the present inventors have found that, even when a catalytic metal does not contact an electrolyte, the catalytic metal can be effectively used by forming three-phase boundary with water. Therefore, the catalysts (a) and (b) adopt a configuration that the (a-3) the catalytic metal is carried inside the mesopores in which the electrolyte cannot enter, whereby the catalytic activity can be improved. Meanwhile, when the catalytic metal is carried inside the mesopores in which the electrolyte cannot enter, the transport distance of gas such as oxygen is increased, and gas transportability is lowered. Thus a sufficient catalytic activity cannot be elicited, and catalytic performance would be deteriorated under high load conditions. On the other hand, the (a-2) the pore volume of micropores in which the electrolyte and the catalytic metal can hardly enter or cannot enter at all is sufficiently secured, or the (b-1) the mode radius of the micropores is set large, whereby the transport path of gas can be sufficiently secured. Therefore, gas such as oxygen can be efficiently transported to the catalytic metal in the mesopores, namely, gas transport resistance can be reduced. According to the above configuration, gas (for example, oxygen) passes through micropores (gas transportability is improved), gas can be efficiently contacted with the catalytic metal. Therefore, when the catalysts (a) and (b) are used in the catalyst layer, since micropores are present in large volume, a reaction gas can be transported to the surface of the catalytic metal present in the mesopores via the micropores (path), and gas transport resistance can be further reduced. Therefore, the catalyst layer containing the catalysts (a) and (b) can exhibit higher catalytic activity, namely, the catalytic reaction can be further promoted. Therefore, the membrane electrode assembly and the fuel cell having the catalyst layer containing the catalysts (a) and (b) are excellent in power generation performance.

Figure 3:
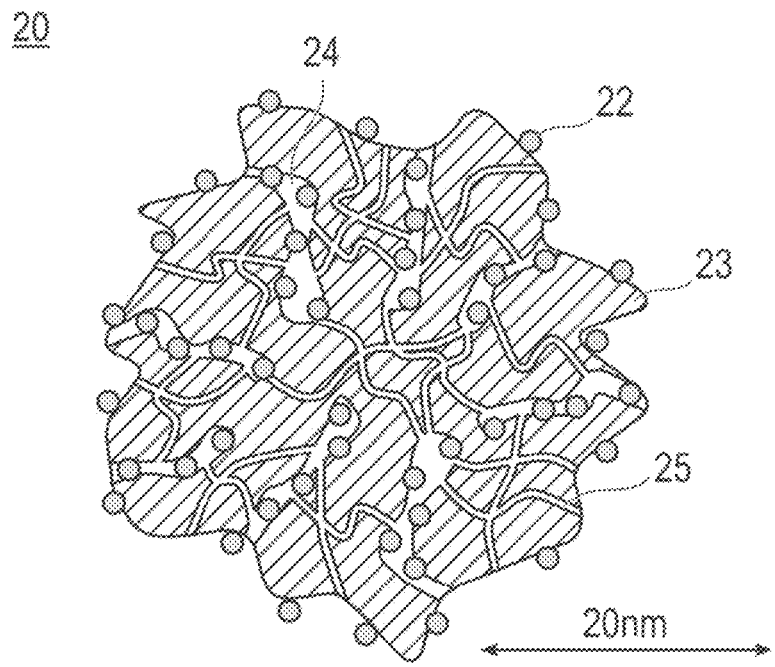
FIG. 3 is a schematic explanatory cross-sectional view showing the shape and structure of the catalysts (a) and (b) according to an embodiment of the present invention.

FIG. 3 is a schematic explanatory cross-sectional view showing the shape and structure of the catalysts (a) and (b). As shown in FIG. 3, the catalysts (a) and (b) shown by reference 20 is composed of a catalytic metal 22 and a catalyst carrier 23. Also, a catalyst 20 has pores with a radius of less than 1 nm (micropores) 25 and pores with a radius of 1 nm or more (mesopores) 24. The catalytic metal 22 is deposited inside the mesopores 24. At least a part of the catalytic metal 22 may be deposited inside the mesopores 24, while a part may be deposited on the surface of the catalyst carrier 23. However, it is preferable that substantially all of the catalytic metal 22 is deposited inside the mesopores 24, from the viewpoint of preventing contact between the electrolyte and the catalytic metal in the catalyst layer. The phrase "substantially all of the catalytic metal" as used herein is not particularly limited so long as it is the amount that can sufficiently improve the catalytic activity. The phrase "substantially all of the catalytic metal" is present in an amount of preferably 50% by weight or more (upper limit: 100% by weight) and more preferably 80% by weight or more (upper limit: 100% by weight), in the whole catalytic metal.

The phrase "the catalytic metal is deposited inside the mesopores" as used herein can be confirmed by reduction in the volume of mesopores before and after carrying the catalytic metal on the catalyst carrier. Specifically, the catalyst carrier (hereinafter referred to simply as "carrier") has micropores and mesopores, and each pore has a certain volume. When the catalytic metal is deposited in the pores, the volume of each pore is reduced. Therefore, when the difference between the volume of mesopores of the catalyst (carrier) before carrying the catalytic metal and the volume of mesopores of the catalyst (carrier) after carrying the catalytic metal [=(volume before carrying)−(volume after carrying)] exceeds 0, it means that "the catalytic metal is deposited inside the mesopores". Similarly, when the difference between the volume of micropores of the catalyst (carrier) before carrying the catalytic metal and the volume of micropores of the catalyst (carrier) after carrying the catalytic metal [=(volume before carrying)−(volume after carrying)] exceeds 0, it means that "the catalytic metal is deposited inside the micropores". Preferably, the catalytic metal is deposited in the mesopores more than in the micropores (i.e., reduction in the volume of mesopores between before and after carrying>reduction in the volume of micropores between before and after carrying). By this, gas transport resistance can be reduced, and a path for gas transportation can be sufficiently secured. The reduction in the pore volume of mesopores between before and after carrying the catalytic metal is preferably 0.02 cc/g carrier or more, and more preferably 0.02 to 0.4 cc/g carrier, in consideration of the reduction in gas transport resistance, securing of the path for gas transportation, and the like.

In addition, the pore volume of pores with a radius of less than 1 nm (micropores) (of the catalyst after carrying the catalytic metal) is 0.3 cc/g carrier or more, and/or the mode radius (modal radius) of pore distribution of micropores (of the catalyst after carrying the catalytic metal) is 0.3 nm or more and less than 1 nm. Preferably, the pore volume of micropores is 0.3 cc/g carrier or more, and the mode radius of pore distribution of micropore is 0.3 nm or more and less than 1 nm. When the pore volume and/or mode radius of micropores is within the above range, micropores sufficient for gas transportation can be secured, and gas transport resistance is small. Therefore, a sufficient amount of gas can be transported to the surface of the catalytic metal present in the mesopores via the micropores (path), thus the catalyst of the present invention can exhibit high catalytic activity, namely, catalytic reaction can be promoted. Also, electrolyte (ionomer) and liquid (for example, water) cannot enter the micropores, and only gas can be selectively passed (gas transport resistance can be reduced). The pore volume of micropores is more preferably 0.3 to 2 cc/g carrier, and particularly preferably 0.4 to 1.5 cc/g carrier, in consideration of the effect of improving gas transportability. In addition, the mode radius of pore distribution of micropores is more preferably 0.4 to 1 nm, and particularly preferably 0.4 to 0.8 nm. The pore volume of pores with a radius of less than 1 nm is herein also simply referred to as "pore volume of micropores". Similarly, the mode radius of pore distribution of micropores is herein also simply referred to as "mode radius of micropores".

The pore volume of the pores with a radius of 1 nm or more and less than 5 nm (mesopores) (of the catalyst after carrying the catalytic metal) is not particularly limited, but is preferably 0.4 cc/g carrier or more, more preferably 0.4 to 3 cc/g carrier, and particularly preferably 0.4 to 1.5 cc/g carrier. When the pore volume is within the above range, more catalytic metal can be stored (carried) in the mesopores, the electrolyte and the catalytic metal in the catalyst layer can be physically separated (contact between the electrolyte and the catalytic metal can be more effectively suppressed and prevented). Therefore, the activity of the catalytic metal can be more effectively used. Also, by the presence of many mesopores, the action and effects by the present invention can be more remarkably exhibited, and the catalytic reaction can be more effectively promoted. In addition, the micropores act as a transport path of gas, and three-phase boundary can be more remarkably formed by water, thus the catalytic activity can be further improved. The pore volume of pores with a radius of 1 nm or more is herein also simply referred to as "pore volume of mesopores".

The mode radius (modal radius) of pore distribution of pores with a radius of 1 nm or more (mesopores) (of the catalyst after carrying the catalytic metal) is not particularly limited, but is preferably 1 to 5 nm, more preferably 1 to 4 nm, and particularly preferably 1 to 3 nm. In the case of the mode radius of pore distribution of mesopores described above, a more sufficient amount of the catalytic metal can be stored (carried) in the mesopores, and the electrolyte and the catalytic metal in the catalyst layer can be physically separated (contact between the electrolyte and the catalytic metal can be more effectively suppressed and prevented). Therefore, the activity of the catalytic metal can be more effectively used. Also, by the presence of large-volume mesopores, the action and effects by the present invention can be more remarkably exhibited, and the catalytic reaction can be more effectively promoted. In addition, the micropores act as a transport path of gas, and three-phase boundary can be more remarkably formed by water, thus the catalytic activity can be further improved. The mode radius of pore distribution of mesopores is herein also simply referred to as "mode radius of mesopores".

The BET specific surface area [BET specific surface area of the catalyst per 1 g of the carrier ($m^2$/g carrier)] (of the catalyst after carrying the catalytic metal) is not particularly limited, but is preferably 900 $m^2$/g carrier or more, and more preferably 1000 $m^2$/g carrier or more. The BET specific surface area [BET specific surface area of the catalyst per 1 g of the carrier ($m^2$/g carrier)] (of the catalyst after carrying the catalytic metal) is more preferably 1000 to 3000 $m^2$/g carrier, and particularly preferably 1100 to 1800 $m^2$/g carrier. In the case of the specific surface area as described above, sufficient mesopores and micropores can be secured, thus while securing micropores (lower gas transport resistance) sufficient for gas transportation, more catalytic metal can be stored (carried) in the mesopores. Also, the electrolyte and the catalytic metal in the catalyst layer can be physically separated (contact between the electrolyte and the catalytic metal can be more effectively suppressed and prevented). Therefore, the activity of the catalytic metal can be more effectively used. In addition, by the presence of many micropores and mesopores, the action and effects by the present invention can be more remarkably exhibited, and the catalytic reaction can be more effectively promoted. Moreover, the micropores act as a transport path of gas, and three-phase boundary can be more remarkably formed by water, thus catalytic activity can be further improved.

The "BET specific surface area ($m^2$/g carrier)" of the catalyst is herein measured by the nitrogen adsorption method. Specifically, about 0.04 to 0.07 g of catalyst powder is accurately weighed, and sealed in a sample tube. The sample tube is preliminarily dried in a vacuum drier at 90° C. for several hours to obtain a measurement sample. An electronic balance (AW220) manufactured by Shimadzu Corporation is used for weighing. Meanwhile, as to the coated sheet, about 0.03 to 0.04 g of the net weight of a coating layer in which the weight of Teflon (registered trademark) (substrate) of the same area is deducted from the total weight of the coated sheet is used as a sample weight. Next, a BET specific surface area is measured under the following measurement conditions. A BET plot is obtained from a relative pressure (P/PO) in the range of about 0.00 to 0.45, in the adsorption side of the adsorption and desorption isotherms, thereby calculating a BET specific surface area from the slope and intercept thereof.

[Formula 1]

<Measurement Conditions>

Measurement instrument: High accuracy all-automated gas adsorption instrument manufactured by BEL Japan, Inc. BELSORP 36

Adsorption gas: $N_2$

Dead volume measurement gas: He

Adsorption temperature: 77 K (temperature of liquid nitrogen)

Pre-measurement treatment: vacuum dry at 90° C. for several hours (set on the measurement stage after purging with He)

Measurement mode: isothermal adsorption process and desorption process

Measurement relative pressure $P/P_0$: about 0 to 0.99

Setting time for equilibration: 180 seconds for every relative pressure

The "radius of pores of micropores (nm)" as used herein refers to a radius of pores measured by the nitrogen adsorption method (MP method). Also, the "mode radius of pore distribution of micropores (nm)" as used herein refers to a pore radius at a point taking a peak value (maximum frequency) in the differential pore distribution curve obtained by the nitrogen adsorption method (MP method). The lower limit of the pore radius of micropores is a lower limit that can be measured by the nitrogen adsorption method, i.e., 0.42 nm or more. Similarly, the "radius of pores of mesopores (nm)" refers to a radius of pores measured by the nitrogen adsorption method (DH method). Also, the "mode radius of pore distribution of mesopores (nm)" refers to a pore radius at a point taking a peak value (maximum frequency) in the differential pore distribution curve obtained by the nitrogen adsorption method (DH method). The upper limit of the pore radius of mesopores is not particularly limited, but is 5 nm or less.

The "pore volume of micropores" as used herein refers to a total volume of micropores with a radius of less than 1 nm present in the catalyst, and expressed as a volume per 1 g of the carrier (cc/g carrier). The "pore volume of micropores (cc/g carrier)" is calculated as an area (integrated value) under the differential pore distribution curve obtained by the nitrogen adsorption method (MP method). Similarly, the "pore volume of mesopores" refers to a total volume of mesopores with a radius of 1 nm or more and less than 5 nm present in the catalyst, and expressed as a volume per 1 g of the carrier (cc/g carrier). The "pore volume of mesopores (cc/g carrier)" is calculated as an area (integrated value) under the differential pore distribution curve obtained by the nitrogen adsorption method (DH method).

The "differential pore distribution" as used herein refers to a distribution curve obtained by plotting a pore diameter on the horizontal axis and a pore volume corresponding to the pore diameter in the catalyst on the vertical axis. To be specific, in the case of regarding a pore volume of catalyst obtained by the nitrogen adsorption method (MP method in the case of micropores; DH method in the case of mesopores) as V and a pore diameter as D, a value (dV/d (log D)) obtained by dividing differential pore volume dV by logarithmic difference of the pore diameter d (log D) is calculated. Moreover, the differential pore distribution curve is obtained by plotting the dV/d (log D) on the average pore diameter of each section. The differential pore volume dV indicates an increment of the pore volume between measuring points.

The method for measuring the radius of micropores and pore volume by the nitrogen adsorption method (MP method) is not particularly limited, and for example, the method described in known documents such as "Science of Adsorption" (second edition, written jointly by Seiichi Kondo, Tatsuo Ishikawa and Ikuo Abe, MARUZEN Co., Ltd.), "Fuel Cell Characterization Methods" (edited by Yoshio Takasu, Masaru Yoshitake, Tatsumi Ishihara, Kagaku-Dojin Publishing Co., Inc.), and R. Sh. Mikhail, S. Brunauer, E. E. Bodor J. Colloid Interface Sci., 26, 45 (1968). The radius of micropores and pore volume by the nitrogen adsorption method (MP method) are a value herein measured by the method described in R. Sh. Mikhail, S. Brunauer, E. E. Bodor J. Colloid Interface Sci., 26, 45 (1968).

The method for measuring the radius of mesopores and pore volume by the nitrogen adsorption method (DH method) is not also particularly limited, and for example, the method described in known documents such as "Science of Adsorption" (second edition, written jointly by Seiichi Kondo, Tatsuo Ishikawa and Ikuo Abe, MARUZEN Co., Ltd.), "Fuel Cell Characterization Methods" (edited by Yoshio Takasu, Masaru Yoshitake, Tatsumi Ishihara, Kagaku-Dojin Publishing Co., Inc.), and D. Dollion, G. R. Heal: J. Appl. Chem., 14, 109 (1964). The radius of mesopores and pore volume by the nitrogen adsorption method (DH method) are a value herein measured by the method described in D. Dollion, G. R. Heal: J. Appl. Chem., 14, 109 (1964).

The method for producing the catalyst having a specific pore distribution as described above is not particularly limited, but usually it is important that the pore distribution (micropores and mesopores) of the carrier is set to the pore distribution as described above. Specifically, as the method for producing a carrier having micropores and mesopores, and having a pore volume of micropores of 0.3 cc/g carrier or more, the methods described in publications such as Japanese Patent Application Publication No. 2010-208887 (U.S. Patent Application Publication No. 2011-318254, the same applies hereafter) and WO 2009/75264 (U.S. Patent Application Publication No. 2011-058308, the same applies hereafter) are preferably used. Also, as the method for producing a carrier having micropores and mesopores, and having micropores with a mode radius of pore distribution of 0.3 nm or more and less than 1 nm, the methods described in publications such as Japanese Patent Application Publication No. 2010-208887 and WO 2009/75264 are preferably used.

(Catalyst (c))

The catalyst (c) contains a catalyst carrier and a catalytic metal carried on the catalyst carrier, and satisfies the following configurations (c-1) to (c-3):

(c-1) the catalyst has pores with a radius of 1 nm or more and less than 5 nm;

(c-2) the catalyst has a pore volume of the pores with a radius of 1 nm or more and less than 5 nm of 0.8 cc/g carrier or more; and (c-3) the catalyst has a specific surface area as electrochemically measured of the catalytic metal of 60 $m^2/g$ carrier or less.

According to the catalyst having the configurations of the (c-1) to (c-3) described above, the pores of the catalyst can be suppressed from being filled with water, and at the same time, pores contributing to transportation of a reaction gas can be sufficiently secured. As a result, a catalyst excellent in gas transportability can be provided. Specifically, a volume of mesopores effective to gas transportation can be sufficiently secured, and by reducing a specific surface area of the catalytic metal, an amount of water retained in the mesopores in which the catalytic metal is carried can be sufficiently reduced. Therefore, it is suppressed that in the mesopores is filled with water, thus gas such as oxygen can be more efficiently transported to the catalytic metal in the mesopores. Namely, gas transport resistance in the catalyst layer can be further reduced. As a result, the catalyst (c) of this embodiment can promote the catalytic reaction, and exhibit higher catalytic activity. Therefore, a membrane electrode assembly and a fuel cell having a catalyst layer using the catalyst (c) of this embodiment are excellent in power generation performance.

Figure 4:
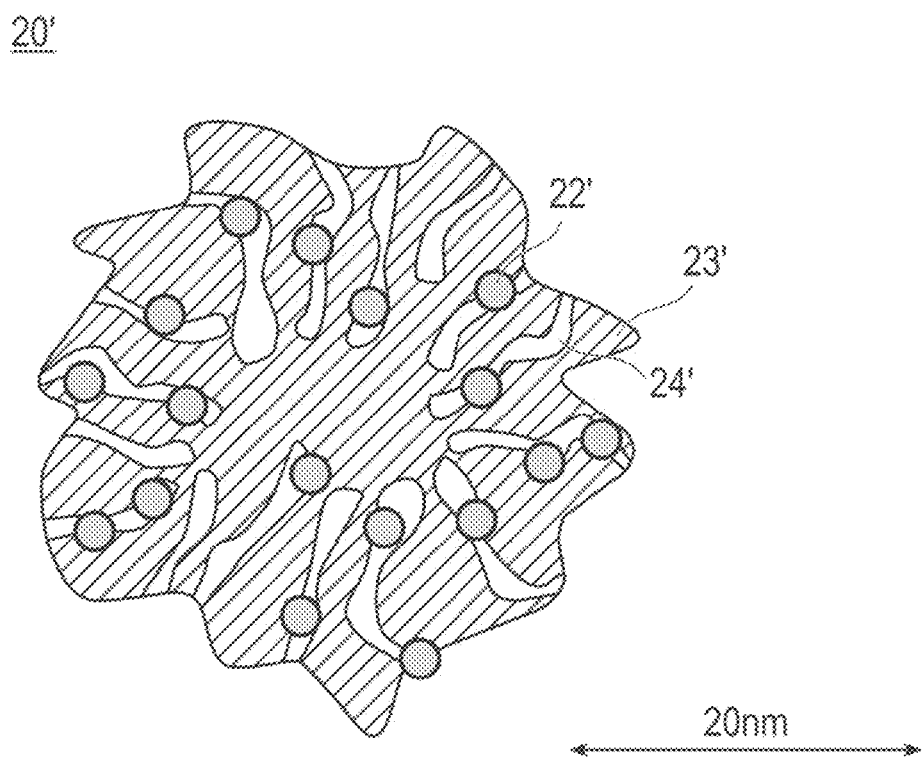
FIG. 4 is a schematic explanatory cross-sectional view showing the shape and structure of the catalyst (c) according to an embodiment of the present invention.

FIG. 4 is a schematic explanatory cross-sectional view showing the shape and structure of the catalysts (c). As shown in FIG. 4, the catalysts (c) shown by reference 20' is composed of a catalytic metal 22' and a catalyst carrier 23'. The catalyst 20' has pores with a radius of 1 nm or more and less than 5 nm (mesopores) 24'. The catalytic metal 22' is mainly carried inside the mesopores 24'. Also, at least apart of the catalytic metal 22' can be carried inside the mesopores 24', and a part may be carried on the surface of the catalyst carrier 23'. However, it is preferable that substantially all the catalytic metal 22' is carried inside the mesopores 24', from the viewpoint of preventing the contact between the electrolyte (electrolyte polymer, ionomer) and the catalytic metal in the catalyst layer. When the catalytic metal contacts the electrolyte, the area specific activity on the surface of the catalytic metal is reduced. On the other hand, according to the above configuration, it is possible to make the electrolyte not to enter the mesopores 24' of the catalyst carrier 23', and the catalytic metal 22' and the electrolyte can be physically separated. Moreover, three-phase boundary can be formed with water, and consequently the catalytic activity can be improved. The phrase "substantially all the catalytic metal" is not particularly limited so long as it is the amount that can sufficiently improve the catalytic activity. The phrase "substantially all the catalytic metal" is present in an amount of preferably 50% by weight or more (upper limit: 100% by weight) and more preferably 80% by weight or more (upper limit: 100% by weight), in the whole catalytic metal.

The pore volume of pores with a radius of 1 nm or more and less than 5 nm (mesopores) (of the catalyst after carrying the catalytic metal) is 0.8 cc/g carrier or more. The pore volume of mesopores is preferably 0.8 to 3 cc/g carrier, and particularly preferably 0.8 to 2 cc/g carrier. In the case where the pore volume is within the range described above, pores contributing to transportation of a reaction gas are much secured, thus transport resistance of the reaction gas can be reduced. Therefore, the reaction gas can be rapidly transported to the surface of the catalytic metal stored in the mesopores, thus the catalytic metal is effectively used. Furthermore, in the case where the volume of mesopores is within the range described above, the catalytic metal can be stored (carried) in the mesopores, and the electrolyte and the catalytic metal in the catalyst layer can be physically separated (contact between the electrolyte and the catalytic metal can be more effectively suppressed and prevented). As described above, in the embodiment in which the contact between the catalytic metal in the mesopores and the electrolyte is suppressed, the activity of the catalyst can be more effectively used, as compared with the case where the amount of the catalytic metal carried on the surface of the carrier is much. The pore volume of pores with a radius of 1 nm or more and less than 5 nm is herein also simply referred to as "pore volume of mesopores".

The BET specific surface area [BET specific surface area of the catalyst per 1 g of the carrier ($m^2/g$ carrier)] (of the catalyst after carrying the catalytic metal) is not particularly limited, but is preferably 900 $m^2/g$ carrier or more, more preferably 1000 $m^2/g$ carrier or more, and further more preferably 1200 $m^2/g$ carrier or more. Also, the upper limit of the BET specific surface area of the catalyst is not particularly limited, but is preferably 3000 $m^2/g$ carrier or less, and more preferably 1800 $m^2/g$ carrier or less. In the case of the specific surface area as described above, sufficient mesopores can be secured, and also the particles of the catalytic metal can be carried with good dispersibility. The phrase "the particles of the catalytic metal with good dispersibility" as used herein refers to a state where the particles of the catalytic metal are carried while the particles are separated from each other, without agglomerating each other. When the particles of the catalytic metal are agglomerated and formed in a lump, local flux of gas would become large, and gas transport resistance would become large, in the vicinity of the lump of catalytic metal. On the other hand, when the individual particles of the catalytic metal are carried in a dispersed state, local flux in the vicinity of the individual particles would become small as compared with the above embodiment. Therefore, transport resistance of the reaction gas can be reduced, and the catalytic metal can be effectively used.

In the catalyst (c), the catalytic metal (catalyst component) has a specific surface area as electrochemically measured of 60 $m^2/g$ carrier or less. The catalytic metal has a specific surface area as electrochemically measured of preferably 5 to 60 $m^2/g$ carrier, more preferably 5 to 30 $m^2/g$ carrier, and particularly preferably 10 to 25 $m^2/g$ carrier. The surface of the catalytic metal is hydrophilic, and water generated by catalytic reaction is likely to adsorb, thus water is likely to be retained in the mesopores in which the catalytic metal is stored. When water is retained in the mesopores, gas transport path would become narrow, and the diffusion rate of the reaction gas in water would be low, thus gas transportability would be reduced. On the other hand, the specific surface area as electrochemically measured of the catalytic metal is set relatively small as the above range, whereby the amount of water adsorbed to the surface of the catalytic metal can be reduced. As a result, water is hard to be retained in the mesopores, and the water content in the catalyst and also in the catalytic layer can be reduced. The "specific surface area as electrochemically measured of the catalytic metal" described herein can be measured by the method described in, for example, Journal of Electroanalytical Chemistry 693 (2013) 34 to 41, etc. The "specific surface area as electrochemically measured of the catalytic metal" herein adopts the value measured by the following method.

(Method for Electrochemically Measuring a Specific Surface Area of Catalytic Metal)

With regard to the cathode catalyst layer, electrochemical effective surface area (ECA: Electrochemical surface area) is measured by cyclic voltammetry. Hydrogen gas humidified so as to be saturated at a measurement temperature is flowed into the opposed anode, and this anode is used as a reference electrode and a counter electrode. Nitrogen gas similarly humidified is flowed into the cathode, and valves of entrance and exit of the cathode are closed immediately before starting measurement, and nitrogen gas is sealed. Measurement is performed in this state, in the following conditions, using an electrochemical measuring system (manufactured by HOKUM DENKO CORPORATION, model: HZ-5000).

[Formula 2]

Electrolyte solution: 1 M sulfuric acid (manufactured by Wako Pure Chemical Industries Ltd., for measurement of harmful metal)

Scanning rate: 50 mV/s

Number of cycles: 3 cycles

Lower limit voltage value: 0.02 V

Upper limit voltage value: 0.9 V

The method for producing the catalyst having a specific pore volume as described above is not particularly limited, but it is important that the mesopore volume of the carrier is set to the pore distribution as described above. Specifically, as the method for producing a carrier having mesopores, and having a pore volume of mesopores of 0.8 cc/g carrier or more, the methods described in publications such as Japanese Patent Application Publication No. 2010-208887 (U.S. Patent Application Publication No. 2011-318254, the same applies hereafter) and WO 2009/075264 (U.S. Patent Application Publication No. 2011-058308, the same applies hereafter) are preferably used.

In the catalysts (a) and (b), at least a part of the catalytic metal is carried inside the mesopores, and in the catalyst (c), at least a part of the catalytic metal is preferably carried inside the mesopores.

The material of the carrier constituting the catalyst is not particularly limited, and known carrier materials can be used. The material that can form pores having the pore volume or mode diameter (primary pores) specified in the above catalysts (a) to (c) inside the carrier and has sufficient specific surface area and sufficient electron conductivity for carrying the catalyst component inside the pores (mesopores) in a dispersion state is preferable. Specifically, the main component is carbon. Specifically, examples thereof include carbon particles made of carbon black (such as Ketjen black, oil furnace black, channel black, lamp black, thermal black and acetylene black), and activated carbon. The phrase "the main component is carbon" signifies that carbon atoms are contained as the main component, and is a concept including both "consisting only of carbon atoms" and "consisting substantially of carbon atoms", and an element (s) other than carbon atoms may be contained. The phrase "consisting substantially of carbon atoms" signifies that impurities may be contaminated in an amount of approximately 2 to 3% by weight or less.

More preferably, it is desirable to use carbon black since the desired pore region is easy to form inside the carrier, and particularly preferably, the carrier produced by the methods described in publications such as Japanese Patent Application Publication No. 2010-208887 and WO 2009/75264 are used.

Other than the above carbon materials, porous metals such as Sn (tin) and Ti (titanium), and further, conductive metal oxides and the like can be also used as a carrier.

A BET specific surface area of the catalyst carrier may be any specific surface area so long as it be sufficient to carry the catalyst component in a highly dispersed manner. The BET specific surface area of the carrier is substantially equivalent to the BET specific surface area of the catalyst. The BET specific surface area of the carrier is, for example, 700 $m^2$/g carrier or more, preferably 900 $m^2$/g carrier or more, more preferably 1000 $m^2$/g carrier or more, and particularly preferably 1100 $m^2$/g carrier or more. Also, the upper limit of the BET specific surface area of the carrier is not particularly limited, but is preferably 3000 $m^2$/g carrier or less, and more preferably 1800 $m^2$/g carrier or less. In the case of the specific surface area as described above, sufficient mesopores and sufficient micropores in some cases can be secured, thus further more catalytic metal can be stored (carried) in the mesopores with better dispersibility. Also, mesopores and micropores in some cases sufficient for gas transportation can be secured, thus gas transport resistance can be further reduced. In addition, the electrolyte and the catalytic metal in the catalyst layer can be physically separated (contact between the electrolyte and the catalytic metal can be more effectively suppressed and prevented). Therefore, the activity of the catalytic metal can be more effectively used. Moreover, local flux in the vicinity of the catalytic metal particles becomes small, thus a reaction gas is rapidly transported, and the catalytic metal is effectively used. Also, by the presence of many pores (mesopores) and micropores in some cases, the action and effects by the present invention can be further remarkably exhibited, and the catalytic reaction can be more effectively promoted. Also, the balance between dispersibility of the catalyst component on the catalyst carrier and effective utilization rate of the catalyst component can be properly controlled. In addition, the micropores act as a transport path of gas, and three-phase boundary are more remarkably formed by water, thus catalytic activity can be further improved.

In the present invention, so long as having the pore distribution of micropores and mesopores as described above in the catalyst, a granular porous carrier as described above is not necessarily used.

To be specific, the carrier may also include a non-porous conductive carrier, unwoven fabrics, carbon paper and carbon cloth formed from carbon fibers constituting a gas diffusion layer, and the like. Here, the catalyst can be carried in these non-porous conductive carriers, or can be directly adhered to the unwoven fabrics, carbon paper and carbon cloth and the like which are formed from carbon fibers constituting a gas diffusion layer of the membrane electrode assembly.

The catalytic metal constituting the catalyst has a function of the catalysis of electrochemical reaction. The catalytic metal used in the anode catalyst layer is not particularly limited so long as it provides catalysis to oxidation reaction of hydrogen, and a known catalyst can be similarly used. In addition, the catalytic metal used in the cathode catalyst layer is not also particularly limited so long as it provides catalysis to reduction reaction of oxygen, and a known catalyst can be similarly used. Specifically, the catalytic metal can be selected from metals such as platinum, ruthenium, iridium, rhodium, palladium, osmium, tungsten, lead, iron, copper, silver, chromium, cobalt, nickel, manganese, vanadium, molybdenum, gallium, and aluminum, and alloys thereof.

Of these, those that contain at least platinum are preferably used, in terms of improving catalytic activity, poisoning resistance to carbon monoxide and the like, heat resistance, and the like. Namely, the catalytic metal is preferably platinum or contains platinum and a metal component other than platinum, and is more preferably platinum or a platinum-containing alloy. Such catalytic metal can exhibit high activity. The alloy compositions preferably contain 30 to 90 atom % of platinum, and the content of the metal to be alloyed with platinum is preferably 10 to 70 atom %, although it depends to the type of metal to be alloyed. Alloy is generally obtained by adding one or more kinds of metal elements or non-metallic elements to a metal element, and is a general term for those which have metallic characteristics. The structure of an alloy includes an eutectic alloy which is a mixture of crystals of different component elements, a solid solution which is formed by completely molten component elements, an alloy which component elements form an intermetallic compound or a compound of a metal with a non-metal, or the like, and may be any of them in the present application. In this case, the catalytic metal used in the anode catalyst layer and the catalytic metal used in the cathode catalyst layer may be appropriately selected from the above. Unless otherwise noted herein, the descriptions for catalytic metals for the anode catalyst layer and for the cathode catalyst layer are used interchangeably. However, the catalytic metals for the anode catalyst layer and for the cathode catalyst layer need not be the same, and may be appropriately selected so as to provide the desired action described above.

The shape and size of the catalytic metal (catalyst component) are not particularly limited, and any shape and size similar to those of a known catalyst components can be adopted. For example, those having granular, scaly, or layered shape can be used, and granular shape is preferred.

An average particle size of the catalytic metal (catalytic metal particles) is not particularly limited. The average particle size of the catalytic metal (catalytic metal particles) is, for example, 2 nm or more. In addition, for example, when the catalyst (a) and/or (b) is used as a catalyst, the average particle size of the catalytic metal (catalytic metal particles) is preferably 3 nm or more, more preferably more than 3 nm and 30 nm or less, and particularly preferably more than 3 nm and 10 nm or less. When an average particle size of the catalytic metal of 3 nm or more, the catalytic metal would be relatively firmly carried in the mesopores, and the contact with the electrolyte in the catalyst layer would be more effectively suppressed and prevented. In addition, the micropores would be remained without being blocked by the catalytic metal, and transport path of gas would be more favorably secured, and gas transport resistance can be further reduced. Moreover, elution due to potential change is prevented, and performance deterioration over time can be also suppressed. Therefore, catalytic activity can be further improved, namely, the catalytic reaction can be more efficiently promoted. On the other hand, when the average particle size of the catalytic metal particles is 30 nm or less, the catalytic metal can be carried inside the mesopores of the carrier by a simple method. In addition, in the case of using the catalyst (c) as a catalyst, the average particle size of the catalytic metal (catalytic metal particles) is preferably more than 3 nm. The average particle size of the catalytic metal is more preferably more than 3 nm to 30 nm, and particularly preferably more than 3 nm to 10 nm. When the average particle size of the catalytic metal is more than 3 nm, the specific surface area as electrochemically measured of the catalytic metal can be made small. As a result, as described above, the amount of water adsorbed to the surface of the catalytic metal can be reduced, and mesopores contributing to transportation of a reaction gas can be much secured. Therefore, transport resistance of the reaction gas can be reduced. Moreover, elution due to potential change can be prevented, and performance deterioration over time can be also suppressed. Therefore, catalytic activity can be further improved. Namely, the catalytic reaction can be more efficiently promoted. On the other hand, when the average particle size of the catalytic metal particles is 30 nm or less, the catalytic metal can be carried inside the mesopores of the carrier by a simple method.

The "average particle size of catalytic metal particles" (diameter) and the "average particle radius of catalytic metal particles" in the present invention can be obtained from a crystallite radius obtained from a half-band width of a diffraction peak of a catalytic metal component in the X-ray diffraction, or as an average particle radius of catalytic metal particles examined using a transmission-type electron microscope (TEM). The "average particle size of catalytic metal particles" and the "average particle radius of catalytic metal" herein are a crystallite diameter and a crystallite radius obtained from a half-band width of a diffraction peak of a catalytic metal component in the X-ray diffraction, respectively.

In this embodiment, the content of the catalytic metal per unit catalyst coated area (basis weight, $mg/cm^2$) is not particularly limited so long as sufficient dispersity of the catalyst on the carrier and power generation performance can be obtained, and is, for example, 1 $mg/cm^2$ or less. However, in the case where the catalyst contains platinum or a platinum-containing alloy, the platinum content per unit catalyst coated area is preferably 0.5 $mg/cm^2$ or less. The use of expensive noble-metal catalysts typified by platinum (Pt) and platinum alloys is a factor of expensive fuel cells. Accordingly, it is preferable that a use amount of expensive platinum (a platinum content) is decreased to the above-mentioned range to reduce the costs. The lower limit value is not particularly limited so long as power generation performance can be obtained. In this embodiment, the control of the porous structure of the carrier allows activity per catalyst weight to be improved, thus it is possible to reduce the use amount of the expensive catalyst.

As used herein, the induction coupled plasma emission spectrography (ICP) is used for measuring (confirming) the "catalytic metal (platinum) content per unit catalyst coated area ($mg/cm^2$)". The method for obtaining desired "catalytic metal (platinum) content per unit catalyst coated area ($mg/cm^2$)" can be also easily performed by a person skilled in the art, and the content can be adjusted by controlling the composition (catalyst concentration) and coating amount of slurry.

In addition, a carried amount (also referred to as a carrying ratio) of the catalytic metal in the carrier is not particularly limited. For example, in the case of using at least one of the catalysts (a) and (b) as a catalyst, the carrying ratio is preferably 10 to 80% by weight, and more preferably 20 to 70% by weight, relative to the whole amount of the catalyst (namely, the carrier and the catalytic metal). The carried amount in the above-mentioned range is preferable by reason of allowing sufficient dispersity of the catalyst components on the carrier, the improvement in power generation performance, the economic advantages, and the catalytic activity per unit weight. Moreover, in the case of using the catalyst (c) as a catalyst, a ratio of the catalytic metal relative to the catalyst (also referred to as a "catalyst carrying ratio") is preferably 60% by weight or less, relative to the whole amount of the catalyst (total amount of the carrier and the catalytic metal), and more preferably 40% by weight or less. Furthermore, the catalyst carrying ratio is further preferably 30% by weight or less. On the other hand, the lower limit of the catalyst carrying ratio is preferably 5% by weight or more and more preferably 20% by weight or more. When the catalyst carrying ratio is in the above range, a catalyst having a small specific surface area of the catalytic metal can be obtained. As a result, the amount of water adsorbed to the surface of the catalytic metal can be reduced, and mesopores contributing to transportation of a reaction gas can be much secured. Therefore, transport resistance of the reaction gas can be reduced, and thus the reaction gas is rapidly transported. Moreover, the catalytic metal is effectively used, and consequently, the catalytic activity can be further improved. Namely, the catalytic reaction can be more efficiently promoted. Also, according to this embodiment, the used catalytic metal may be a relatively small amount, which is preferable also from the economic viewpoint. Here, the "catalyst carrying ratio" in the present invention is a value obtained by measuring the weights of the carrier before carrying the catalytic metal and the catalyst after carrying the catalytic metal.

The catalyst layer of the present invention contains an electrolyte in addition to the above catalyst. Here, the electrolyte is not particularly limited, but is preferably an ion-conducting polymer electrolyte. The above polymer electrolyte is also called as the proton-conducting polymer by reason of playing a role of transmitting protons produced around the catalytic active material on the fuel electrode side.

The polymer electrolyte is not particularly limited, and can be properly referred to the conventionally known knowledge. The polymer electrolyte is roughly classified into a fluorine-based polymer electrolyte and a hydrocarbon-based polymer electrolyte, depending on the kind of ion exchange resin that is a constituent material. Among them, a fluorine-based polymer electrolyte is preferable. Namely, the electrolyte is preferably a fluorine-based polymer electrolyte.

Examples of the ion exchange resin that constitutes a fluorine-based polymer electrolyte include perfluorocarbon sulfonic acid based polymers such as Nafion (registered trademark, manufactured by Dupont), Aciplex (registered trademark, manufactured by Asahi Kasei Chemicals Corp.), and Flemion (registered trademark, manufactured by Asahi Glass Co.), perfluorocarbon phosphonic acid based polymers, trifluorostyrene sulfonic acid based polymers, ethylenetetrafluoroethylene-g-styrene sulfonic acid based polymers, ethylene-tetrafluoroethylene copolymers, polyvinylidenefluoride-perfluorocarbon sulfonic acid based polymers, and the like. These fluorine-based polymer electrolytes are preferably used and, a fluorine-based polymer electrolyte consisting of a perfluorocarbon sulfonic acid group polymer is particularly preferably used, from the viewpoint of excellent heat resistance, chemical stability, durability and mechanical strength.

The hydrocarbon-based electrolyte specifically includes sulfonated polyether sulfon (S-PES), sulfonated polyaryletherketone, sulfonated polybenzimidazolealkyl, phosphorylated polybenzimidazolealkyl, sulfonated polystyrene, sulfonated polyether etherketone (S-PEEK), sulfonated polyphenylene (S-PPP), and the like. These hydrocarbon-based polymer electrolytes are preferably used from the manufacturing viewpoint that their raw materials are inexpensive, their manufacturing processes are simple, and their materials are highly selectable. The above-mentioned ion exchange resins may be used singly in only one kind or in combinations of two or more kinds. Also, the above-mentioned materials are not exclusive, and other materials can be used as well.

The conductivity of protons is important in the polymer electrolyte which serves to transmit protons. Here, in the case where EW of the polymer electrolyte is too large, ion conductivity of the whole catalyst layer would deteriorate. Accordingly, the catalyst layer of this embodiment preferably contains the polymer electrolyte with small EW. Specifically, the catalyst layer according of this embodiment contains preferably a polymer electrolyte with an EW of 1500 g/mol or less, more preferably a polymer electrolyte with an EW of 1200 g/mol or less, and particularly preferably a polymer electrolyte with an EW of 1100 g/mol or less.

On the other hand, in the case where EW is too small, the hydrophilicity is so high that smooth movement of water would be difficult. The EW of the polymer electrolyte is preferably 600 g/mol or more from such a viewpoint. Incidentally, EW (Equivalent Weight) represents the equivalent weight of an exchange group having proton conductivity. The equivalent weight is dry weight of an ion exchange membrane per equivalent of the ion exchange group, and represented by a unit of "g/mol".

In addition, it is preferable that the catalyst layer contains two or more kinds of polymer electrolytes with different EW in the power generation surface, and a polymer electrolyte with a lowest EW among polymer electrolytes is used in the region with a relative humidity of gas in the passage of 90% or less. By adopting such material arrangement, the resistance value becomes small, irrespective of the current density region, and battery performance can be improved. EW of the polymer electrolyte used in the region with a relative humidity of gas in the passage of 90% or less, i.e., the polymer electrolyte with a lowest EW is desired to be 900 g/mol or less. Whereby, the above-mentioned effects can be more secured and remarkable.

Furthermore, it is desired to provide the polymer electrolyte with the lowest EW in a region with a temperature higher than an average temperature of the inlet and outlet of cooling water. Whereby, a resistance value can decrease, irrespective of the current density region, and battery performance can be further improved.

Furthermore, it is desired to provide the polymer electrolyte with the lowest EW in a region within the range of 3/5 from at least one of gas supply ports of fuel gas and oxidant gas, relative to a passage length, from the viewpoint of reducing resistance value of fuel cell system.

The catalyst layer may contain an additive such as a water-repellent agent such as polytetrafluoroethylene, polyhexafluoropropylene or tetrafluoroethylene-hexafluoropropylene copolymer, a dispersing agent such as a surfactant, a thickener such as glycerin, ethylene glycol (EG), polyvinyl alcohol (PVA) or propylene glycol (PG), and a pore-forming material, as necessary.

The thickness of the catalyst layer (dry film thickness) is preferably 0.05 to 30 μm, more preferably 1 to 20 μm, and further preferably 2 to 15 μm. Incidentally, the above thickness is applied to both the cathode catalyst layer and the anode catalyst layer. However, the thicknesses of the cathode catalyst layer and the anode catalyst layer may be the same or different.

(Method for Producing Catalyst Layer)

The method for producing the catalyst layer of the present invention is not particularly limited, and for example, the known methods such as the method described in Japanese Patent Application Publication No. 2010-21060 are applied, or properly modified and applied. Preferable embodiments will be described below.

As a method for producing an electrode catalyst layer for fuel cell having a specific exposure ratio of catalytic metal of 50% or more, a method of using a mixed liquid (water-alcohol mixed solvent) with a mixing weight ratio of water and alcohol of 60/40 or more and less than 91/9 is mentioned. A method of preparing a coating liquid containing such a water-alcohol mixed solvent (water-alcohol mixed liquid), a catalyst, and an electrolyte, and applying the obtained coating liquid to a substrate to form an electrode catalyst layer is used. Preferably, a method of preparing a coating liquid containing a catalyst comprising a platinum-containing catalytic metal carried on a catalyst carrier with a BET specific surface area of 900 m²/g carrier or more, an electrolyte, and a water-alcohol mixed solvent with a mixing weight ratio of water and alcohol of 60/40 or more and less than 91/9, and applying the obtained coating liquid to a substrate to form an electrode catalyst layer is used. Namely, the present invention provides a method for producing an electrode catalyst layer for fuel cell, which includes preparing a coating liquid containing a catalyst comprising a catalyst carrier with a BET specific surface area of 900 m²/g carrier or more and a platinum-containing catalytic metal carried on the catalyst carrier, an electrolyte, and a water-alcohol mixed solvent with a mixing weight ratio of water and alcohol of 60/40 or more and less than 91/9, and applying the coating liquid to form an electrode catalyst layer.

The above method will be described below, but the technical scope of the present invention is not limited only to the following embodiments. In addition, some conditions such as the materials of each constituent of the catalyst layer are as described above, thus the description is omitted.

First, a carrier with a BET specific surface area of 700 m²/g carrier or more, preferably, 900 m²/g carrier or more (herein also referred to as "porous carrier" or "conductive porous carrier") is prepared. Specifically, the carrier may be prepared as described in the method for producing a carrier as described above. Whereby, pores having a specific pore distribution specified in the catalysts (a) to (c) can be formed in the carrier. A carrier with a particularly large BET specific surface area is used, whereby a catalytic metal can be efficiently carried (stored) inside the carrier (especially mesopores). Also, graphitization of the carrier can be promoted at the same time by heat treatment, to improve corrosion resistance.

The conditions of the heat treatment may be varies depending on the material, and can be properly selected so as to obtain a desired porous structure. Generally, a high heating temperature would bring a tendency for a mode diameter of pore distribution to shift toward a larger pore diameter. Such heat treatment conditions may be determined in accordance with the material while confirming the porous structure and can be easily determined by a person skilled in the art.

Subsequently, the catalytic metal is carried on the porous carrier to form catalyst powder. Carrying of the catalytic metal on the porous carrier can be performed by a known method. For example, the known methods such as impregnation method, liquid phase reduction carrying method using an acid such as citric acid, evaporation to dryness method, colloid adsorption method, spray pyrolysis method, and reversed micelle (microemulsion) method can be used. In order to set an average particle size of the catalytic metal in a desired range, the catalytic metal may be carried on the carrier and then subjected to heating treatment in a reducing atmosphere. At this time, a heating treatment temperature is preferably in the range of 300 to 1200° C., more preferably in the range of 500 to 1150° C., and particularly preferably in the range of 700 to 1000° C. Also, a reducing atmosphere is not particularly limited so long as it contributes to particle growth of the catalytic metal, but it is preferable that the treatment is performed in a mixed atmosphere of a reducing gas and an inert gas. The reducing gas is not particularly limited, but hydrogen ($H_2$) gas is preferable. In addition, the inert gas is not particularly limited, but helium (He), neon (Ne), argon (Ar), krypton (Kr), xenon (Xe), nitrogen ($N_2$) and the like can be used. The above inert gas may be used singly or in combinations of two or more kinds. Moreover, a heating treatment time is preferably 0.1 to 2 hours, and more preferably 0.5 to 1.5 hours. When the catalyst carrier has mesopores, the particles of the catalytic metal can be grown and carried (stored) in the mesopores of the catalyst carrier, by performing the above step.

Subsequently, a water-alcohol mixed solvent with a mixing weight ratio of water and alcohol of 60/40 or more and less than 91/9 is prepared, and the resultant water-alcohol mixed solvent, a catalyst powder, and polymer electrolyte are mixed to prepare a coating liquid (catalyst ink). Such mixed solvent with a high water content is used as a dispersion medium, whereby it is possible to prevent the electrolyte from coating the entrance of mesopores. Here, when the mixing weight ratio of water and alcohol is less than 60/40 (water is less than 60 parts by weight with respect to 40 parts by weight of alcohol), the electrolyte would excessively coat the catalyst, and the exposure ratio of catalytic metal specified in the invention of the present application cannot be achieved. Particularly, when using the catalysts (a) to (c), the electrolyte would coat the mesopore opening, and the exposure ratio of catalytic metal specified in the invention of the present application cannot be also achieved. In contrast, when the mixing weight ratio of water and alcohol is 91/9 or more (water is 91 parts by weight or more with respect to 9 parts by weight of alcohol), the catalyst would excessively agglomerate to increase in size, and the catalyst layer is formed in a form excessively phase-separated from the electrolyte. Therefore, a transport distance of a reaction gas would be increased, and gas transportability would be lowered, thus a sufficient catalytic activity cannot be elicited, and catalytic performance would be deteriorated particularly under high load conditions. In consideration of further improvement in gas transportability and catalytic activity, the mixing weight ratio of water and alcohol is preferably 65/35 to 90/10, and more preferably 70/30 to 90/10.

Water is not particularly limited, and tap water, pure water, ion-exchange water, distilled water and the like can be used. Also, alcohol is not particularly limited. Specific examples include methanol, ethanol, 1-propanol, 2-propanol, 1-butanol, 2-methyl-1-propanol, 2-butanol, 2-methyl-2-propanol, cyclohexanol, and the like. Among them, methanol, ethanol, 1-propanol, 2-propanol, 1-butanol, 2-methyl-1-propanol, 2-butanol and 2-methyl-2-propanol are preferable. The above alcohols may be used singly or in mixed liquid of two or more kinds. Namely, it is preferable that the alcohol is at least one kind selected from the group consisting of methanol, ethanol, 1-propanol, 2-propanol, 1-butanol, 2-methyl-1-propanol, 2-butanol and 2-methyl-2-propanol. By using such highly hydrophilic lower alcohol, uneven distribution of the electrolyte can be prevented. Among these alcohols, an alcohol having a boiling point less than 100° C. is more preferably used. Use of the alcohol having a boiling point less than 100° C. is advantageous in terms of simplified drying process. As the alcohol having a boiling point less than 100° C., those selected among methanol (boiling point: 65° C.), ethanol (boiling point: 78° C.), 1-propanol (boiling point: 97° C.), 2-propanol (boiling point: 82° C.), and 2-methyl-2-propanol (boiling point: 83° C.) may be cited. The alcohol can be used singly in only one kind or in a mixture of two or more kinds.

As described above, the polymer electrolyte is roughly classified into a fluorine-based polymer electrolyte and a hydrocarbon-based polymer electrolyte, depending on the kind of ion exchange resin which is a constituent material. Among them, a fluorine-based polymer electrolyte is preferable. Namely, the electrolyte is preferably a fluorine-based polymer electrolyte. By using hydrophobic fluorine-based polymer electrolyte as described above, the electrolyte is further likely to agglomerate by increasing the water content in the solvent.

An amount of the solvent constituting the catalyst ink is not particularly limited so long as it is an amount such as to allow the electrolyte to be completely dissolved. Specifically, the concentration of the solid content containing the catalyst powder, the polymer electrolyte and the like is preferably 1 to 50% by weight and more preferably about 5 to 30% by weight in the electrode catalyst ink.

Incidentally, in the case of using additives such as water-repellent agent, dispersing agent, thickener and pore-forming material, these additives may be added to the catalyst ink. In this case, an added amount of the additives is not particularly limited so long as it is an amount such as not to disturb the above effects by the present invention. For example, the added amount of each of the additives is preferably 5 to 20% by weight, relative to the whole weight of the electrode catalyst ink.

Next, the catalyst ink is applied on a surface of a substrate. An application method on the substrate is not particularly limited and known methods can be used. Specifically, the application can be performed using a known method such as spray (spray coating) method, Gulliver printing method, die coater method, screen printing method, and doctor blade method.

In this case, a solid polyelectrolyte membrane (an electrolyte layer) and a gas diffusion substrate (a gas diffusion layer) can be used as the substrate onto which the catalyst ink is applied. In such a case, after forming the catalyst layer on the surface of a solid polyelectrolyte membrane (an electrolyte layer) or a gas diffusion substrate (a gas diffusion layer), an obtained laminated body may be directly used for producing a membrane electrode assembly. Alternatively, the catalyst layer may be obtained by using as a substrate a peelable substrate such as polytetrafluoroethylene (PTFE) [Teflon (registered trademark)] sheet, forming a catalyst layer on the substrate, and then peeling the catalyst layer portion off the substrate.

Lastly, a coated layer (membrane) of the catalyst ink is dried under air atmosphere or an inert gas atmosphere at room temperature to 180° C. for 1 to 60 minutes. Thus, the catalyst layer is formed.

(Membrane Electrode Assembly)

According to another embodiment of the present invention, a membrane electrode assembly for fuel cell containing the electrode catalyst layer for fuel cell is provided. Namely, a membrane electrode assembly for fuel cell having a solid polyelectrolyte membrane 2, a cathode catalyst layer arranged on one side of the electrolyte membrane, an anode catalyst layer arranged on the other side of the electrolyte membrane, and a pair of gas diffusion layers (4a and 4c) which sandwich the electrolyte membrane 2, the anode catalyst layer 3a and the cathode catalyst layer 3c is provided. Then, in this membrane electrode assembly, at least one of the cathode catalyst layer and the anode catalyst layer is the catalyst layer of the embodiment described above.

In consideration of the necessity for the improvement in proton conductivity and the improvement in the transport property (the gas diffusivity) of reactant gas (especially $O_2$), at least the cathode catalyst layer is preferably the catalyst layer of the embodiment described above. However, the catalyst layer according to the above-mentioned embodiment is not particularly limited; for example, the catalyst layer may be used as the anode catalyst layer, or as both the cathode catalyst layer and the anode catalyst layer.

According to further embodiment of the present invention, a fuel cell having the membrane electrode assembly of the above-mentioned embodiment is provided. Namely, an embodiment of the present invention is a fuel cell having the membrane electrode assembly of the above-mentioned embodiment sandwiched with a pair of an anode separator and a cathode separator.

The constituents of the PEFC 1 using the catalyst layer according to the above-mentioned embodiment will be described below with reference to FIG. 1. However, the features of the present invention are based on the catalyst layer. Therefore, the specific configurations of members except the catalyst layer constituting the fuel cell may be properly modified with reference to the conventionally known knowledge.

(Electrolyte Membrane)

The electrolyte membrane, for example, consists of a solid polyelectrolyte membrane 2 such as can be seen in the configuration shown in FIG. 1. This solid polyelectrolyte membrane 2 has the function of allowing the protons generated in an anode catalyst layer 3a to be selectively transmitted to a cathode catalyst layer 3c along the membrane thickness direction during the operation of a PEFC 1. Also, the solid polyelectrolyte membrane 2 serves as a barrier to prevent the fuel gas supplied to the anode side from mixing with the oxidant gas supplied to the cathode side.

An electrolyte material composing the solid polyelectrolyte membrane 2 is not particularly limited, and can be properly referred to the conventionally known knowledge. For example, the fluorine-based polymer electrolyte and the hydrocarbon-based polymer electrolyte, which are described as the polymer electrolyte in the above, may be used. In this case, it is not necessary to use the same as the polymer electrolyte used for the catalyst layer.

A thickness of the electrolyte layer may be properly selected in consideration of the characteristics of the obtained fuel cell, and is not particularly limited. The thickness of the electrolyte layer is ordinarily approximately 5 to 300 μm. When the thickness of the electrolyte layer is within such a range, the balance between the strength during the manufacturing process of the membrane, the durability during usage, and output performance during usage can be properly controlled.

(Gas Diffusion Layer)

The gas diffusion layers (the anode gas diffusion layer 4a and the cathode gas diffusion layer 4c) function to promote diffusion of a gas (fuel gas or oxidant gas) supplied through gas passages (6a and 6c) of a separator to catalyst layers (3a and 3c), as well as function as an electronic conduction path.

A material composing a substrate of the gas diffusion layers (4a and 4c) is not particularly limited, and can be properly referred to the conventionally known knowledge. Examples thereof include sheet-like materials with conductivity and porosity, such as fabrics made of carbon, paper-like paper-making material, felt and unwoven fabric. The thickness of the substrate may be properly determined in consideration of the characteristics of the obtained gas diffusion layer, and it may be approximately 30 to 500 μm.

When the thickness of the substrate is a value within such a range, the balance between the mechanical strength and the diffusivity of gas, water and the like can be properly controlled.

The gas diffusion layer preferably contains water-repellent agent with the aim of enhancing water repellency to prevent a flooding phenomenon and the like. Examples of the water-repellent agents include, but not particularly limited to, fluorine-based polymer materials such as polytetrafluoroethylene (PTFE), polyfluorovinylidene (PVdF), polyhexafluoropropylene and tetrafluoroethylene-hexafluoropropylene copolymer (FEP), as well as polypropylene and polyethylene.

Also, in order to further improve water repellency, the gas diffusion layer may be such as to have a carbon particle layer comprising an aggregate of carbon particles containing the water-repellent agent (a microporous layer; MPL, not shown in the drawings) on the catalyst layer side of the substrate.

The carbon particles contained in the carbon particle layer are not particularly limited, and conventionally known materials such as carbon black, graphite and expanded graphite may be properly adopted. Among them, carbon black such as oil furnace black, channel black, lamp black, thermal black and acetylene black may be preferably used by reason of having excellent electron conductivity and large specific surface area. The average particle size of the carbon particles is preferably approximately 10 to 100 nm. Thus, high drainage by capillary force is obtained, and the contact with the catalyst layer also can be improved.

Examples of the water-repellent agent used for the carbon particle layer include the same as the above-mentioned water-repellent agent. Above all, the fluorine-based polymer materials may be preferably used by reason of being excellent in water repellency and corrosion resistance during the electrode reaction.

A mixing ratio between the carbon particles and the water-repellent agent in the carbon particle layer should be approximately 90:10 to 40:60 at weight ratio (carbon particles:water-repellent agent) in consideration of the balance between the water repellency and the electron conductivity. Incidentally, also the thickness of the carbon particle layer is not particularly limited and may be properly determined in consideration of water repellency of the obtained gas diffusion layer.

(Method for Producing Membrane Electrode Assembly)

A method for producing the membrane electrode assembly is not particularly limited, and a conventionally known method can be used. For example, it is possible to use a method which comprises transferring by means of a hot press or coating a catalyst layer on a solid polyelectrolyte membrane, drying it, and joining a gas diffusion layer to it, or a method which comprises previously coating a catalyst layer on one side of a microporous layer side of a gas diffusion layer (or a substrate layer when a microporous layer is not included) and drying to prepare two gas diffusion electrodes (GDE), and joining these gas diffusion electrodes to both sides of a solid polyelectrolyte membrane by means of a hot press. Coating and assembly conditions of the hot press and the like may be properly adjusted, depending on the kinds (perfluorosulfonic acid-based and hydrocarbon-based) of the solid polyelectrolyte membrane and the polymer electrolyte in the catalyst layer.

(Separator)

A separator functions to electrically connect each cell in series when configuring a fuel cell stack by connecting in series a plurality of single cells of the fuel cell such as a polymer electrolyte fuel cell. Also, the separator serves as a barrier for separating fuel gas, oxidant gas and refrigerant from each other. In order to secure the passages of these gasses, as described above, a gas passage and a refrigerating passage are preferably provided on each of the separators. As the material for composing the separators, conventionally known materials, for example, carbon such as dense carbon graphite and carbon plate, or metals such as stainless steel can be properly adopted without any limitation. A thickness and size of the separator, and a shape and size of each passage to be provided are not particularly limited, and may be properly selected in consideration of the desired output performance of the obtained fuel cell.

A method for producing the fuel cell is not particularly limited, and a conventionally known knowledge in the field of the fuel cell can be properly referred to.

Moreover, in order that the fuel cell can generate a desired voltage, a fuel cell stack, which has a structure such as to connect in series a plurality of membrane electrode assemblies through a separator, may be formed. A shape of the fuel cell is not particularly limited, and may be properly selected so as to obtain battery characteristics such as desired voltage.

The above-mentioned PEFC and membrane electrode assembly use a catalyst layer excellent in power generation performance. Accordingly, the PEFC and the membrane electrode assembly are excellent in power generation performance.

The PEFC according to the present embodiment and the fuel cell stack using the same can be, for example, mounted on a motor vehicle as a drive power source.

EXAMPLES

The effects by the present invention will be described by using the following examples and comparison examples. However, the technical scope of the present invention should not be construed to be confined to the following examples. In the following examples, unless otherwise noted, operations were performed at room temperature (25° C.). Also, unless otherwise noted, "%" and "part(s)" respectively mean "% by weight" and "part(s) by weight".

Synthesis Example 1

A carbon material A was prepared, according to the method described in WO 2009/75264. The resultant carbon material A was heated at 1800° C. for 5 minutes in an argon gas atmosphere to prepare a carrier A.

The carrier A obtained as above was measured for pore volumes of micropores and mesopores, mode diameters of micropores and mesopores and BET specific surface area. As a result, it was found that the pore volume of micropores was 0.75 cc/g carrier; the pore volume of mesopores was 0.90 cc/g carrier; the mode diameter of micropores was 0.75 nm; the mode diameter of mesopores was 1.66 nm; and the BET specific surface area was 1166 $m^2$/g carrier.

Synthesis Example 2

A catalyst powder A was obtained by using the carrier A prepared in the Synthesis Example 1, carrying platinum (Pt) as a catalytic metal on the carrier A with a carrying ratio of 30% by weight and an average particle size of 3.3 nm. Specifically, 46 g of the carrier A was immersed in 429 g of a dinitrodiamine platinum nitric acid solution with a platinum concentration of 4.6% by weight (platinum content: 19.7 g), and the mixture was stirred, then 100 ml of 100% ethanol was added as a reducing agent. The resultant solution was stirred and mixed at a boiling point for 7 hours, to support platinum on the carrier A. Then, the mixture was filtered and dried to obtain a catalyst powder with a carrying ratio of 30% by weight. Thereafter, the catalyst powder was retained at 900° C. for 1 hour in a hydrogen atmosphere, to obtain a catalyst powder A.

The catalyst powder A obtained as above was measured for pore volumes of micropores and mesopores, mode diameters of micropores and mesopores and BET specific surface area. As a result, it was found that the pore volume of micropores was 0.69 cc/g carrier; the pore volume of mesopores was 0.80 cc/g carrier; the mode diameter of micropores was 0.75 nm; the mode diameter of mesopores was 1.66 nm; and the BET specific surface area was 1226 $m^2$/g carrier.

Example 1-1

The catalyst powder A prepared in the Synthesis Example 2 and a fluorine-based polymer electrolyte (EW=700 g/mol) as a polymer electrolyte were mixed so that a weight ratio of the carbon carrier to the ionomer was 0.9 (mixture 1). Separately, a mixed solvent 1 with a mixing weight ratio of water and n-propyl alcohol of 80/20 was prepared. The mixed solvent 1 was added to the mixture 1 so as to give a solid content ratio (Pt+carbon carrier+ionomer) of 15% by weight, to prepare a cathode catalyst ink.

Separately, Ketjen black EC300J (manufactured by Ketjen black international Co.) was heat-treated at 2000 to 3000° C. for 5 to 20 hours in an argon atmosphere, to prepare graphite Ketjen black (particle size: 30 to 60 nm) as a carrier. Platinum (Pt) with an average particle size of 2.3 nm as a catalytic metal was carried on the carrier so as to give a carrying ratio of 30% by weight, to obtain a catalyst powder. The catalyst powder and an ionomer dispersion liquid (Nafion (registered trademark) D2020, EW=1000 g/mol, manufactured by DuPont) as a polymer electrolyte were mixed so as to give a weight ratio of the carbon carrier to the ionomer of 1.2 (mixture 2). Separately, a mixed solvent 2 with a mixing weight ratio of water and n-propyl alcohol of 60/40 was prepared. The mixed solvent 2 was added to the mixture 2 so as to give a solid content ratio (Pt+carbon carrier+ionomer) of 15% by weight, to prepare an anode catalyst ink.

Next, the cathode catalyst ink and the anode catalyst ink prepared as described above were respectively applied to a transfer substrate (Teflon (registered trademark) sheet) by a screen printing method so as to have a Pt basis weight of 0.15 mg/$cm^2$, and dried at 80° C. for 15 minutes. Whereby a cathode catalyst layer with a film thickness (dry film thickness) of 14.7 μm and an anode catalyst layer with a film thickness (dry film thickness) of 2 μm were respectively formed on the transfer substrate. In addition, the cathode catalyst layer and anode catalyst layer were cut so as to have a size of 5 cm×2 cm. An exposure ratio of catalytic metal of the cathode catalyst layer obtained above was measured by the CO adsorption method and found to be 97%. In addition, as to the cathode catalyst layer obtained above, a specific surface area of the catalytic metal (catalyst component) was electrochemically measured and found to be 18.6 $m^2$/g carrier.

A gasket (manufactured by Teijin Dupont Films Japan Limited, Teonex, film thickness: 25 μm (adhesive layer: 10 μm)) was provided around the both sides of a polymer electrolyte membrane (manufactured by Dupont, NAFION NR211, film thickness: 25 μm). Subsequently, the cathode catalyst layer and anode catalyst layer (size: 5 cm×2 cm) prepared as described above were respectively placed on each side of the exposed part of the polymer electrolyte membrane, and hot-pressed at 150° C., 0.8 MPa, for 10 minutes, to obtain a catalyst coated membrane (CCM). The both surfaces of the obtained catalyst coated membrane (CCM) were sandwiched by the gas diffusion layers (24BC, manufactured by SGL Group—The Carbon Company) to obtain a membrane electrode assembly 1) (MEA 1)).

The resultant membrane electrode assembly (1) was evaluated for catalytic activity (Experiment 1) and gas transport resistance (Experiment 2) by the following methods. As a result, it was found that the power generation current per a surface area of platinum at 0.9 V and the gas transport resistance of the membrane electrode assembly 1) was 846 (μA/$cm^2$ (Pt)) and 8.6 (s/m), respectively.

Experiment 1

Evaluation of Oxygen Reduction (ORR) Activity

As to the membrane electrode assemblies prepared in Examples and Comparative Examples, the power generation current per a surface area of platinum at 0.9 V (μA/$cm^2$ (Pt)) was measured under the following evaluation conditions, and the oxygen reduction activity was evaluated.
[Formula 3]
<Evaluation Conditions>
Temperature: 80° C.
Gas component: Hydrogen (anode side)/Oxygen (cathode side)
Relative humidity: 100% RH/100% RH
Pressure: 150 kPa (abs)/150 kPa (abs)
Voltage scanning direction: Anode Experiment 2

Evaluation of Gas Transport Resistance

As to the membrane electrode assemblies prepared in Examples and Comparative Examples, gas transport resistance was evaluated according to the method described in T. Mashio et al. ECS Trans., 11, 529, (2007).

Specifically, a limiting current density (A/$cm^2$) was measured using diluted oxygen. A gas transport resistance (s/m) was calculated from an inclination of the limiting current density (A/$cm^2$) to oxygen partial pressure (kPa). Gas transport resistance is in proportion to a total pressure of gas, and can be separated into a component dependent on the total pressure of gas (gas transport resistance due to molecular diffusion) and a component independent of the total pressure of gas. The former is a transport resistant component in relatively large pores as of 100 nm or more present in a gas diffusion layer and the like, for example, while the latter is a transport resistant component in relatively small pores as of less than 100 nm present in a catalyst layer and the like. As described above, the total pressure dependency of gas transport resistant is measured, and the component independent of the total pressure is extracted, thereby obtaining gas transport resistant in the catalyst layer.

Example 1-2

A mixed solvent 3 with a mixing weight ratio of water and n-propyl alcohol of 90/10 was prepared.

The same procedure was carried out as in Example 1-1, except for using the mixed solvent 3 prepared as described above, in place of the mixed solvent 1 in Example 1-1, to form a cathode catalyst layer on a transfer substrate. An exposure ratio of catalytic metal of the cathode catalyst layer obtained above was measured and consequently found to be 93%. In addition, as to the cathode catalyst layer obtained as above, a specific surface area of the catalytic metal (catalyst component) was electrochemically measured and found to be 21.1 $m^2$/g carrier.

Next, the same procedure was carried out as in Example 1-1, except for using the cathode catalyst layer formed as described above instead, in Example 1-1, to obtain a membrane electrode assembly 2) (MEA (2)).

Also, the resultant membrane electrode assembly 2) was evaluated for catalytic activity (experiment 1) and gas transport resistance (experiment 2) by the same methods as in Example 1-1. As a result, the power generation current per a surface area of platinum at 0.9 V of the membrane electrode assembly 2) was 998 ($\mu$A/$cm^2$ (Pt)), and the gas transport resistance was 7.2 (s/m).

Example 1-3

A mixed solvent 4 with a mixing weight ratio of water and n-propyl alcohol of 60/40 was prepared.

The same procedure was carried out as in Example 1-1, except for using the mixed solvent 4 prepared as described above, in place of the mixed solvent 1 in Example 1-1, to form a cathode catalyst layer on a transfer substrate. An exposure ratio of catalytic metal of the cathode catalyst layer obtained above was measured and consequently found to be 95%. In addition, as to the cathode catalyst layer obtained as above, a specific surface area of the catalytic metal (catalyst component) was electrochemically measured and found to be 19.6 $m^2$/g carrier.

Next, the same procedure was carried out as in Example 1-1, except for using the cathode catalyst layer formed as described above instead, in Example 1-1, to obtain a membrane electrode assembly (3) (MEA (3)).

Also, the resultant membrane electrode assembly (3) was evaluated for catalytic activity (experiment 1) and gas transport resistance (experiment 2) by the same methods as in Example 1-1. As a result, the power generation current per a surface area of platinum at 0.9 V of the membrane electrode assembly (2) was 908 ($\mu$A/$cm^2$ (Pt)), and the gas transport resistance was 12.8 (s/m).

It can be seen from the above results that the MEAs (1) to (3) using the catalyst layer of the present invention have extremely low gas transport resistance, and have particularly excellent catalytic activity (oxygen reduction activity). It is considered from the above results that the catalyst layer of the present invention can improve gas transportability and exhibit high catalytic activity.

Comparative Example 1

Ketjen black EC300J (manufactured by Ketjen black international Co., a BET specific surface area of 718 $m^2$/g carrier) was used as the catalyst carrier (carrier B).

5 parts by weight of the carrier B was sufficiently dispersed in 2500 parts by weight of aqueous solution of chloroplatinic acid (containing 0.2% by weight of platinum) by using a homogenizer. Next, 50 parts by weight of sodium citrate was added thereto and the obtained mixture was sufficiently mixed to prepare a reaction liquid. Moreover, the reaction liquid was refluxed at 85° C. for 4 hours by using a reflux reactor while being stirred, thereby the platinum was reduced and carried on the surface of the Ketjen black.

After the reaction was ended, the sample solution was cooled to room temperature, and powder of the Ketjen black on which the platinum was carried was filtrated by a suction filtration device and was sufficiently washed by water.

Thereafter, the filtrated powder was dried at 80° C. for 6 hours under reduced pressure to obtain a catalyst powder B with a carrying ratio of 50% by weight and an average particle size (diameter) of the catalytic metal of 2.5 nm. Regarding the catalyst powder B, the pore volume of micropores was 0.23 cc/g carrier; the pore volume of mesopores was 0.30 cc/g carrier; and the BET specific surface area was 720 $m^2$/g carrier. In the catalyst powder B, the mode radius of mesopores or micropores was not clearly detected.

Next, 10 parts by weight of the catalyst powder B, 50 parts by weight of ion-exchanged water, 50 parts by weight of n-propyl alcohol (a mixing weight ratio of water and n-propyl alcohol of 50/50), and 4.5 parts by weight of polymer electrolyte were mixed. Incidentally, a NAFION (registered trademark) solution (manufactured by Aldrich, containing 20% by weight of NAFION (registered trademark), EW=1000) was used as the polymer electrolyte. Further, the mixture was sufficiently dispersed with an ultrasonic homogenizer and vacuum-degassed to obtain a catalyst ink. The catalyst ink was used for forming a cathode catalyst layer and an anode catalyst layer.

Next, the catalyst ink was applied in a size of 5 cm×5 cm onto a transfer substrate formed from polytetrafluoroethylene (PTFE) by a screen printing method such that the platinum basis weight became 0.12 mg/$cm^2$. Thereafter, the transfer substrate was processed at 130° C. for 30 minutes to obtain a cathode catalyst layer and an anode catalyst layer with a film thickness (dry film thickness) of 6.5 μm.

An exposure ratio of catalytic metal of the cathode catalyst layer obtained above was measured by the CO adsorption method and found to be 45%. In addition, as to the cathode catalyst layer obtained above, a specific surface area of the catalytic metal was electrochemically measured and found to be 27.4 $m^2$/g carrier.

The same procedure was carried out as in Example 1, except for changing each size of the cathode catalyst layer and the anode catalyst layer to 5 cm×5 cm, to obtain a membrane electrode assembly 4) (MEA 4)). The MEA 4) was evaluated for catalytic activity (experiment 1) and gas transport resistance (experiment 2) by the same methods as in Example 1. The results thereof are presented in Table 1.

Example 2-1

The weight ratios of ion-exchanged water and n-propyl alcohol were changed to 60 parts by weight and 40 parts by weight (a mixing weight ratio of water and n-propyl alcohol of 60/40) respectively at the time of producing the catalyst ink in Comparative Example 1. The same procedure was carried out as in Comparative Example 1, except for the above change, to obtain a cathode catalyst layer and an anode catalyst layer.

An exposure ratio of catalytic metal of the cathode catalyst layer obtained by the method was measured by the CO adsorption method and found to be 52%. In addition, as to the cathode catalyst layer obtained above, a specific surface area of the catalytic metal was electrochemically measured and found to be 33.3 $m^2$/g carrier.

A membrane electrode assembly (5) (MEA 5)) was obtained using the cathode catalyst layer and the anode catalyst layer in the same manner as in Comparative Example 1. The MEA (5) was evaluated for catalytic activity (experiment 1) and gas transport resistance (experiment 2) by the same methods as in Example 1. The results thereof are presented in Table 1.

Example 2-2

The weight ratios of ion-exchanged water and n-propyl alcohol were changed to 80 parts by weight and 20 parts by weight (a mixing weight ratio of water and n-propyl alcohol of 80/20) respectively at the time of producing the catalyst ink in Comparative Example 1. The same procedure was carried out as in Comparative Example 1, except for the above change, to obtain a cathode catalyst layer and an anode catalyst layer.

An exposure ratio of catalytic metal of the cathode catalyst layer obtained by the method was measured by the CO adsorption method and found to be 65%. In addition, as to the cathode catalyst layer obtained above, a specific surface area of the catalytic metal was electrochemically measured and found to be 30.7 $m^2$/g carrier.

A membrane electrode assembly 6) (MEA 6)) was obtained using the cathode catalyst layer and the anode catalyst layer in the same manner as in Comparative Example 1. The MEA (6) was evaluated for catalytic activity (experiment 1) and gas transport resistance (experiment 2) by the same methods as in Example 1. The results thereof are presented in Table 1.

Example 2-3

The weight ratios of ion-exchanged water and n-propyl alcohol were changed to 90 parts by weight and 10 parts by weight (a mixing weight ratio of water and n-propyl alcohol of 90/10) respectively at the time of producing the catalyst ink in Comparative Example 1. The same procedure was carried out as in Comparative Example 1, except for the above change, to obtain a cathode catalyst layer and an anode catalyst layer.

An exposure ratio of catalytic metal of the cathode catalyst layer obtained by the method was measured by the CO adsorption method and found to be 62%. In addition, as to the cathode catalyst layer obtained above, a specific surface area of the catalytic metal was electrochemically measured and found to be 26.9 $m^2$/g carrier.

A membrane electrode assembly (7) (MEA (7)) was obtained using the cathode catalyst layer and the anode catalyst layer in the same manner as in Comparative Example 1. The MEA 7) was evaluated for catalytic activity (experiment 1) and gas transport resistance (experiment 2) by the same methods as in Example 1. The results thereof are presented in Table 1.

Comparative Example 2

The weight ratios of ion-exchanged water and n-propyl alcohol were changed to 100 parts by weight and 10 parts by weight (a mixing weight ratio of water and n-propyl alcohol of 100/10) respectively at the time of producing the catalyst ink in Comparative Example 1. The same procedure was carried out as in Comparative Example 1, except for the above change, to obtain a cathode catalyst layer and an anode catalyst layer.

An exposure ratio of catalytic metal of the cathode catalyst layer obtained by the method was measured by the CO adsorption method and found to be 38%. In addition, as to the cathode catalyst layer obtained above, a specific surface area of the catalytic metal was electrochemically measured and found to be 29.6 $m^2$/g carrier.

A membrane electrode assembly (8) (MEA (8)) was obtained using the cathode catalyst layer and the anode catalyst layer in the same manner as in Comparative Example 1. The MEA (8) was evaluated for catalytic activity (experiment 1) and gas transport resistance (experiment 2) by the same methods as in Example 1. The results thereof are presented in Table 1.

TABLE 1

| | Water/NPA (w/w) | Catalytic activity ($\mu$A/$cm^2$_Pt) | Gas transport resistance (s/m) | Exposure ratio of catalytic metal (%) |
| --- | --- | --- | --- | --- |
| MEA (4) | 50/50 | 689 | 19.9 | 45 |
| MEA (5) | 60/40 | 790 | 14.5 | 52 |
| MEA (6) | 80/20 | 802 | 13.2 | 65 |
| MEA (7) | 90/10 | 801 | 13.1 | 62 |
| MEA (8) | 100/10 | 352 | 25.1 | 38 |

NPA: n-Propyl alcohol

As presented in Table 1, it is found that by using a mixed liquid with a mixing weight ratio of water and alcohol of 60/40 or more and less than 91/9 in preparation of a slurry, the exposure ratio of catalytic metal can be adjusted to 50% or more.

This application is based upon the prior Japanese Patent Application No. 2014-220573, filed on Oct. 29, 2014, the entire disclosure contents of which are incorporated herein by reference.

DESCRIPTION OF THE REFERENCES

1 . . . Polymer electrolyte fuel cell (PEFC),
2 . . . Solid polyelectrolyte membrane,
3 . . . Catalyst layer,
3a . . . Anode catalyst layer,
3c . . . Cathode catalyst layer,
4a . . . Anode gas diffusion layer,
4c . . . Cathode gas diffusion layer,
5 . . . Separator,
5a . . . Anode separator,
5c . . . Cathode separator,
6a . . . Anode gas passage,
6c . . . Cathode gas passage,
7 . . . Refrigerant passage,
10 . . . Membrane electrode assembly (MEA),
20, 20' . . . Catalyst,
22, 22' . . . Catalytic metal (catalyst component),
23, 23' . . . Carrier,
24, 24' . . . Mesopores,
25 . . . Micropores.

The invention claimed is:

1. An electrode catalyst layer for fuel cell comprising a catalyst containing a catalyst carrier and a catalytic metal carried on the catalyst carrier and an electrolyte, wherein the electrolyte is a proton-conducting polymer, wherein the catalyst is partially coated with the proton-conducting polymer, a specific surface area of the catalytic metal which a reactant gas of the fuel cell can reach without passing through the electrolyte is 50% or more, with respect to the total specific surface area of the catalytic metal, the catalytic metal is formed to have a total specific surface area of between 5 and 60 $m^2$/g related to the catalyst carrier, the catalyst has mesopores with a radius of 1 nm or more and less than 5 nm, a part of mesopore openings of the mesopores is not coated with the electrolyte, and at least a part of the catalytic metal is carried inside the mesopores, whose openings are not coated with the electrolyte, and the difference between the volume of mesopores of the catalyst carrier before carrying the catalytic metal and the volume of mesopores of the catalyst after carrying the catalytic metal is 0.02 cc/g carrier or more.

2. An electrode catalyst layer for fuel cell comprising a catalyst containing a catalyst carrier and a catalytic metal carried on the catalyst carrier and an electrolyte, wherein the electrolyte is a proton-conducting polymer, wherein the catalyst is partially coated with the electrolyte, a specific surface area of the catalytic metal which a reactant gas of the fuel cell can reach without passing through the electrolyte is 50% or more, with respect to the total specific surface area of the catalytic metal, the catalytic metal is formed to have a total specific surface area of between 5 and 60 $m^2/g$ related to the catalyst carrier, and the catalyst satisfies at least one of the following (a), (b), and (c):

(a) the catalyst has pores with a radius of less than 1 nm and mesopores with a radius of 1 nm or more, a pore volume of the pores with a radius of less than 1 nm of 0.3 cc/g carrier or more, a part of mesopore openings of the mesopores is not coated with the electrolyte and at least a part of the catalytic metal is carried inside the mesopores, whose openings are not coated with the electrolyte;

(b) the catalyst has pores with a radius of less than 1 nm and mesopores with a radius of 1 nm or more, a mode radius of pore distribution of the pores with a radius of less than 1 nm being 0.3 nm or more and less than 1 nm, a part of mesopore openings of the mesopores is not coated with the electrolyte and at least a part of the catalytic metal is carried inside the me sopores, whose openings are not coated with the electrolyte; and (c) the catalyst has mesopores with a radius of 1 nm or more and less than 5 nm, a pore volume of the mesopores of 0.8 cc/g carrier or more, and a specific surface area as electrochemically measured of the catalytic metal of 60 $m^2/g$ carrier or less, a part of mesopore openings of the mesopores is not coated with the electrolyte, and at least a part of the catalytic metal is carried inside the mesopores, whose openings are not coated with the electrolyte.

3. The electrode catalyst layer for fuel cell according to claim 1, wherein the catalyst has a BET specific surface area of 900 $m^2/g$ carrier or more.

4. The electrode catalyst layer for fuel cell according to claim 1, wherein the catalytic metal is platinum or comprises platinum and a metal component other than platinum.

5. The electrode catalyst layer for fuel cell according to claim 1, wherein the electrolyte is a fluorine-based polymer electrolyte.

6. The electrode catalyst layer for fuel cell according to claim 1 wherein the specific surface area of the catalytic metal which gas can reach even without passing through an electrolyte is 80% or more, with respect to the total specific surface area of the catalytic metal.

7. The electrode catalyst layer for fuel cell according to claim 1, wherein the BET specific surface area of the catalyst carrier is 700 $m^2/g$ carrier or more.

8. A method for producing the electrode catalyst layer for fuel cell according to claim 1, comprising preparing a coating liquid containing a catalyst comprising a catalyst carrier with a BET specific surface area of 900 $m^2/g$ carrier or more and a platinum-containing catalytic metal carried on the catalyst carrier, an electrolyte, and a water-alcohol mixed solvent with a mixing weight ratio of water and alcohol of 60/40 or more and less than 91/9, and applying the coating liquid to form an electrode catalyst layer.

9. The method according to claim 8, wherein the alcohol is at least one selected from the group consisting of methanol, ethanol, 1-propanol, 2-propanol, 1-butanol, 2-methyl-1-propanol, 2-butanol, and 2-methyl-2-propanol.

10. A membrane electrode assembly for fuel cell comprising the electrode catalyst layer for fuel cell according to claim 1.

11. A fuel cell comprising the membrane electrode assembly for fuel cell according to claim 10.

12. The electrode catalyst layer for fuel cell according to claim 1, wherein substantially all of the catalytic metal is deposited inside the mesopores.

13. The electrode catalyst layer for fuel cell according to claim 2, wherein substantially all of the catalytic metal is deposited inside the mesopores.

* * * * *